US010071919B2

(12) United States Patent
Lead

(10) Patent No.: US 10,071,919 B2
(45) Date of Patent: Sep. 11, 2018

(54) SEPARATION OF OIL-WATER MIXTURES USING NANOTECHNOLOGY

(71) Applicant: University of South Carolina, Columbia, SC (US)

(72) Inventor: Jamie Lead, Chapin, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 14/627,056

(22) Filed: Feb. 20, 2015

(65) Prior Publication Data

US 2015/0298993 A1    Oct. 22, 2015

Related U.S. Application Data

(60) Provisional application No. 61/942,154, filed on Feb. 20, 2014, provisional application No. 62/038,582, filed on Aug. 18, 2014.

(51) Int. Cl.
*B01J 20/02* (2006.01)
*B01J 20/28* (2006.01)
(Continued)

(52) U.S. Cl.
CPC .......... *C02F 1/288* (2013.01); *B01J 20/28007* (2013.01); *B01J 20/28009* (2013.01);
(Continued)

(58) Field of Classification Search
CPC ........... B03C 1/015; B03C 1/00; B03C 1/288; B03C 1/01; C02F 1/488; H01F 1/005; B01J 20/28009; B01J 20/28007; Y10S 210/925
See application file for complete search history.

(56) References Cited

U.S. PATENT DOCUMENTS 3,818,989 A * 6/1974 Christopher, Jr. ....... C09K 8/82
166/270.1
3,858,656 A * 1/1975 Flournoy ............... C09K 8/584
166/270.1
(Continued)

FOREIGN PATENT DOCUMENTS

JP         60078926 A  *  5/1985
JP      2010075826 A  *  4/2010
JP      2011050813 A  *  3/2011

OTHER PUBLICATIONS

Fast and Selective Removal of Oils . . . Nanoparticles Under Magnetic Field—Zhu.*
(Continued)

*Primary Examiner* — Krishnan S Menon
*Assistant Examiner* — Waqaas Ali
(74) *Attorney, Agent, or Firm* — Dority & Manning, P.A.

(57) ABSTRACT

Methods for extracting oil from a multiphasic liquid are provided. The method can comprise: introducing the multiphasic liquid to a plurality of nanoparticles, and allowing oil in the multiphasic liquid to be adsorbed by the polymeric shell. The nanoparticles comprise a core and a polymeric shell. The method can further comprise removing the nanoparticles from the multiphasic liquid, and/or recovering the oil adsorbed by the polymeric shell after removing the nanoparticles from the multiphasic liquid. The multiphasic liquid can comprise oil and water (e.g., oil and sea water, such as sea water in an area of an oil spill), stomach fluid and a food-grade oil (e.g., olive oil, vegetable oil, canola oil, or a mixture thereof), or other multiphasic liquids having an oil component.

9 Claims, 34 Drawing Sheets

(51) Int. Cl.
| | |
|---|---|
| *C02F 1/28* | (2006.01) |
| *C02F 1/40* | (2006.01) |
| *B01J 20/32* | (2006.01) |
| *C02F 1/48* | (2006.01) |
| *C02F 103/08* | (2006.01) |
| *C02F 101/32* | (2006.01) |
| *C02F 103/00* | (2006.01) |
| *C02F 103/06* | (2006.01) |

(52) U.S. Cl.
CPC ......... *B01J 20/3204* (2013.01); *B01J 20/327* (2013.01); *B01J 20/3293* (2013.01); *C02F 1/285* (2013.01); *C02F 1/40* (2013.01); *C02F 1/488* (2013.01); *C02F 2101/32* (2013.01); *C02F 2103/007* (2013.01); *C02F 2103/06* (2013.01); *C02F 2103/08* (2013.01); *C02F 2303/16* (2013.01); *C02F 2305/08* (2013.01)

(56) References Cited

U.S. PATENT DOCUMENTS

| | | | | |
|---|---|---|---|---|
| 4,725,495 | A * | 2/1988 | Garbe | A45D 40/0087 424/401 |
| 2010/0059444 | A1* | 3/2010 | Moniwa | C02F 1/281 210/662 |
| 2010/0059449 | A1* | 3/2010 | Grass | B03C 1/015 210/695 |
| 2010/0166870 | A1* | 7/2010 | Iyer | A61K 47/48861 424/490 |
| 2013/0256064 | A1* | 10/2013 | Bongaerts | B01J 20/24 184/102 |
| 2014/0042068 | A1* | 2/2014 | Namiki | G21F 9/12 210/222 |
| 2015/0041399 | A1* | 2/2015 | Tennant | C09K 8/58 210/695 |

OTHER PUBLICATIONS

Surface Functionalized Nano Magnetic Particles . . . Removal of Heavy Metal—Tri.*
Synthesis of PVP-coated ultra-small Fe3O4. nanoparticles . . . Agent—Zhang.*
http://dnr.louisiana.gov/assets/TAD/education/BGBB/4/fluids.html, 2000.*
Water Control, 2000, Bailey.*
Rose, Drug Embedded PVP Coated Magnetic Nanoparticles for Targeted Killing of Breast Cancer Cells, Mar. 26, 2013 (Year: 2013).*
Xia, Y.; Boufadel, M. C., Lessons from the Exxon Valdez Oil Spill disaster in Alaska. Disaster Advances 2010, 3 (4).
Atlas, R. M.; Hazen, T. C, Oil Biodegradation and Bioremediation: A Tale of the Two Worst Spills in U.S. History. Environmental Science & Technology 2011, 45 (16), 6709-6715
DeLaune, R. D.; Wright, A. L., Projected Impact of Deepwater Horizon Oil Spill on U.S. Gulf Coast Wetlands. Soil Science Society of America Journal 2011, 75 (5), 1602-1612.
Fontenot, B. E.; Hunt, L. R.; Hildenbrand, Z. L.; Carlton Jr., D. D.; Hyppolite Oka, H.; Walton, J. L.; Hopkins, D.; Osorio, A.; Bjorndal, B.; Hu, O. H.; Schug, K. A., An Evaluation of Water Quality in Private Drinking Water Wells Near Natural Gas Extraction Sites in the Barnett Shale Formation. Environmental Science & Technology 2013, 47 (17), 10032-10040.
Osborn, S. G.; Vengosh, A.; Warner, N. R.; Jackson, R. B., Methane contamination of drinking water accompanying gas-well drilling and hydraulic fracturing. Proceedings of the National Academy of Sciences of the United States of America 2011, 108 (20), 8172-8176.

Payne, K. C.; Jackson, C. D.; Aizpurua, C. E.; Rojas, O. J.; Hubbe, M. A., Oil Spills Abatement: Factors Affecting Oil Uptake by Cellulosic Fibers. Environmental Science & Technology 2012, 46 (14), 7725-7730.
Hubbe, M. A.; Rojas, O. J.; Fingas, M.; Gupta, B. S., Cellulosic Substrates for Removal of Pollutants from Aqueous Systems: A Review. 3. Spilled Oil and Emulsified Organic Liquids. BioResources 2013, 8 (2), 3038-3097.
Deng, D.; Prendergast, D. P.; MacFarlane, J.; Bagatin, R.; Stellacci, F.; Gschwend, P. M., Hydrophobic Meshes for Oil Spill Recovery Devices. Acs Applied Materials & Interfaces 2013, 5 (3), 774-781.
Chu, Y.; Pan, Q., Three-Dimensionally Macroporous Fe/C Nanocomposites As Highly Selective Oil-Absorption Materials. Acs Applied Materials & Interfaces 2012, 4 (5), 2420-2425.
Sun, Z.; Wang, L.; Liu, P.; Wang, S.; Sun, B.; Jiang, D.; Xiao, F.-S., Magnetically motive porous sphere composite and its excellent properties for the removal of pollutants in water by adsorption and desorption cycles. Advanced Materials 2006, 18 (15), 1968-+.
Zhu, Q.; Tao, F.; Pan, Q., Fast and Selective Removal of Oils front Water Surface via Highly Hydrophobic Core-Shell Fe2O3@C Nanoparticles under Magnetic Field. Acs Applied Materials & Interfaces 2010, 2 (11), 3141-3146.
Thanikaivelan, P.; Narayanan, N. T.; Pradhan, B. K.; Ajayan, P. M., Collagen based magnetic nanocomposites for oil removal applications. Scientific Reports 2012, 2 (230), 1-7.
Calcagnile, P.; Fragouli, D.; Bayer, I. S.; Anyfantis, G. C.; Martiradonna, L.; Cozzoli, P. D.; Cingolani, R.; Athanassiou, A., Magnetically Driven Floating Foams for the Removal of Oil Contaminants from Water. Acs Nano 2012, 6 (6), 5413-5419.
Venkatanarasimhan, S.; Raghavachari, D., Epoxidized natural rubber-magnetite nanocomposites for oil spill recovery. Journal of Materials Chemistry A 2013, 1 (3), 868-876.
de Souza, F. G., Jr.; Marins, J. A.; Rodrigues, C. H. M.; Pinto, J. C., A Magnetic Composite for Cleaning of Oil Spills on Water. Macromolecular Materials and Engineering 2010, 295 (10), 942-948.
Gui, X.; Zeng, Z.; Lin, Z.; Gan, Q.; Xiang, R.; Zhu, Y.; Cao, A.; Tang, Z., Magnetic and Highly Recyclable Macroporous Carbon Nanotubes for Spilled Oil Sorption and Separation. Applied Materials & Interfaces 2013, 5, 5845-5850.
Kadar, E.; Simmance, F.; Martin, O.; Voulvoulis, N.; Widdicombe, S.; Mitov, S.; Lead, J. R.; Readman, J. W., The influence of engineered Fe2O3 nanoparticles and soluble (FeCl3) iron on the developmental toxicity caused by CO2-induced seawater acidification. Environmental Pollution 2010, 158 (12), 3490-3497.
Reimer, P.; Balzer, T., Ferucarbotran (Renovist): a new clinically approved RES-specific contrast agent for contrast-enhanced MRI of the liver: properties, clinical development, and applications. European Radiology 2003, 13 (6), 1266-1276.
Pavi'a-Sanders, A.; Zhang, S.; Flores, J. A.; Sanders, J. E.; Raymond, J. E.; Wooley, K. L., Robust Magnetic/Polymer Hybrid Nanoparticles Designed for Crude Oil Entrapment and Recovery in Aqueous Environments. ACS Nano 2013, 7 (9), 7552-7561.
Hitchman, A.; Smith, G. H. S.; Ju-Nam, Y.; Sterling, M.; Lead, J. R., The effect of environmentally relevant conditions on PVP stabilised gold nanoparticles. Chemosphere 2013, 90 (2), 410-416.
Tejamaya, M.; Roemer, I.; Merrifield, R. C.; Lead, J. R., Stability of Citrate, PVP, and PEG Coated Silver Nanoparticles in Ecotoxicology Media. Environmental Science & Technology 2012, 46 (13), 7011-7017.
Zhang, B.; Tu, Z.; Zhao, F.; Wang, J., Superparamagnetic iron oxide nanoparticles prepared by using an improved polyol method. Applied Surface Science 2013, 266, 375-379.
Balnois, E.; Wilkinson, K. J.; Lead, J. R.; Buffle, J., Atomic force microscopy of humic substances: Effects of pH and ionic strength. Environmental Science & Technology 1999, 33 (21), 3911-3917.

* cited by examiner

Stomach fluid

SEPARATION OF OIL-WATER MIXTURES USING NANOTECHNOLOGY

PRIORITY INFORMATION

The present application claims priority to U.S. Provisional Patent Application Ser. No. 61/942,154 titled "Separation of Oil-Water Mixtures Using Nanotechnology" of Jamie Lead filed on Feb. 20, 2014, and to U.S. Provisional Patent Application Ser. No. 62/038,582 titled "Separation of Oil-Water Mixtures Using Nanotechnology" of Jamie Lead filed on Aug. 18, 2014, the disclosures of which are incorporated by reference herein.

BACKGROUND

Recent catastrophic oil spills like the Deepwater Horizon (2010, 210 million gallons), first Gulf War (1990, 420 million gallons), Exxon Valdez (1989, 11 million gallons), and IXTOC 1 (1979, 140 million gallons) are major environmental threats. Significant damage to the marine ecosystem is visible in the form of dead sea-birds, otters, sea-turtles, marine mammals, contaminated planktons, and affected corals. Additionally, oil in bilge water, industrial oil spills from facility repairs, and daily normal operation are constant sources of pollution. Another potential environmental hazard comes from waste waters produced via fracking. Modern extraction techniques like directional drilling and hydraulic fracking are frequently used to access natural gas trapped in shale reserves. The hydrocarbon mixed water associated with shale gas-extraction significantly affects contaminant level in nearby wells and aquifers. The long-term detrimental impact of different oil contaminations on the food-chain is a huge concern. To mitigate the harmful environmental effect of fast spreading oil spills, rapid removal of oil from the water surface is important. Different oil spill cleanup techniques like physical sorption via porous sorbents, mechanical recovery with skimmers, in situ burning, dispersant mediated physical diffusion, and biodegradation have been used to this effect. However, the dynamic state of oil spill in the ocean waters, cost, and time are potential challenges to the existing cleanup methods. Further, some methods like the dispersants and floating booms made from nonrenewable materials pose additional burden to the environment. These limitations inspired the recent scientific impetus to develop new nanomaterials for efficient oil removal.

For example, magnetic nanocomposites were designed to address the difficulty in collection of conventional activated carbon adsorbents. Polysiloxane coated $Fe_2O_3$@C core-shell nanoparticles (NPs) were used for enhanced selectivity in oil-water separation. In a recently reported iron oxide-collagen nanobiocomposite, collagen from industrial wastes served as an oil absorbing agent and the iron oxide core provided magnetic actuation. Calcagnile et. al. incorporated weakly bound iron oxide NPs into a polyurethane foam modified with a hydrophobic polytetrafluoroethylene surface to facilitate oil absorption. Magnetite nanofillers infused in low epoxidized natural rubber showed high absorption capacity for petrol oil. A high concentration of iron oxide NPs within an alky resin biopolymer increased the oil absorption capacity of the composite. These studies highlight the potential of iron oxide NPs for oil removal. This is particularly attractive because iron oxide NPs are widely used in bio-applications and are known for low toxicity owing to the chemically stable oxide coating.

However, most studies were based on homogeneous oil samples and the hydrophobic materials would be unsuitable for submerged oil and are often toxic. Recently, polyacrylic acid-polystyrene co-polymer encapsulated, amphiphilic iron oxide NPs were designed for treatment of crude oil to address these limitations. The iron oxide NPs in most of these studies were synthesized under complex high-temperature and airless conditions, requiring complex, expensive and environmentally burdensome protocols. Additional ligand exchange steps were required to render the hydrophobic NPs biocompatible.

To minimize environmental impact and facilitate an easy scale-up for oil remediation applications, a facile synthetic route is required to directly generate stable, water soluble iron oxide NPs.

SUMMARY

Objects and advantages of the invention will be set forth in part in the following description, or may be obvious from the description, or may be learned through practice of the invention.

Methods are generally provided for extracting oil from a multiphasic liquid. In one embodiment, the method comprises: introducing the multiphasic liquid to a plurality of nanoparticles, and allowing oil in the multiphasic liquid to be adsorbed by the polymeric shell. Generally, the nanoparticles comprise a core and a polymeric shell. The method further comprises, in particular embodiments, removing the nanoparticles from the multiphasic liquid (e.g., utilizing a magnetic force, flowing through a filter, etc.). In certain embodiments, the method can further include recovering the oil adsorbed by the polymeric shell after removing the nanoparticles from the multiphasic liquid.

In one particular embodiment, introducing the multiphasic liquid to a plurality of nanoparticles is achieved by flowing the multiphasic liquid through a cartridge, wherein the cartridge comprises the plurality of nanoparticles.

The multiphasic liquid can comprise oil and water (e.g., oil and sea water, such as sea water in an area of an oil spill), stomach fluid and a food-grade oil (e.g., olive oil, vegetable oil, canola oil, or a mixture thereof), or other multiphasic liquids having an oil component.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Figure 1:
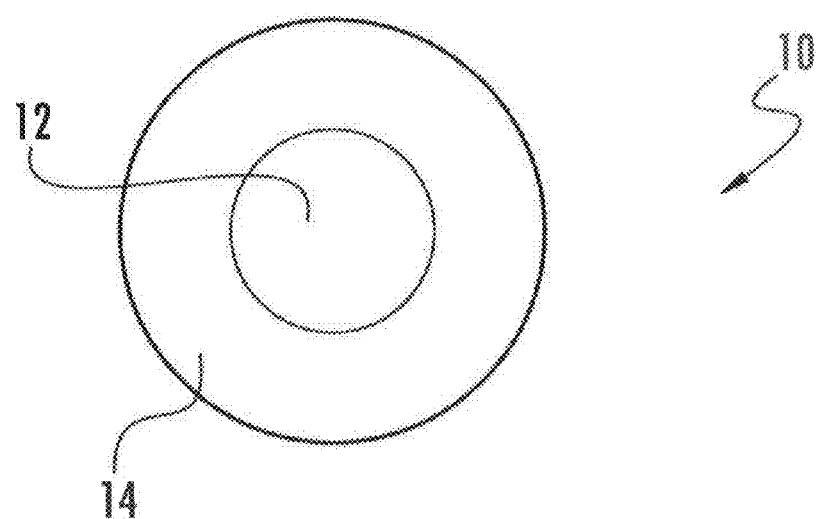
FIG. 1 shows an exemplary nanoparticle having a core surrounded by a polymeric shell.

Repeat use of reference characters in the present specification and drawings is intended to represent the same or analogous features or elements of the present invention.

Definitions

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the prefix "nano" refers a scale of about 1 nm to about 100 nm. For example, particles having an average diameter on the nanometer scale (e.g., from about 1 nm to about 100 nm) are referred to as "nanoparticles". Particles having an average diameter of greater than 1,000 nm (i.e., 1 µm) are generally referred to as "microparticles", since the micrometer scale generally involves those materials having an average size of greater than 1 µm.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "oil" generally refers to any liquid not miscible with water, and specifically to liquids that include hydrocarbons of various molecular weights and other organic compounds.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Methods are generally provided for using nanoparticles to quantitatively remove oil from a multiphasic liquid (e.g., an oil-water mixture). The application is potentially suitable for oil recovery after spills and discharges and also for removing oils from other liquids e.g. edible oils from gastro-intestinal fluids. Subsequent recovery of the oil is feasible. Also, methods are generally provided for forming nanoparticles that are configured to quantitatively remove oil from oil-water mixtures.

Generally, these methods are directed to oil removal, not oil dispersion, with the potential for oil recovery and while utilizing low toxicity nanomaterials that can be formed through a facile, cheap synthesis process using low energy and material inputs. The presently disclosed methods work at oil concentrations relevant to oils spills, and work effectively under environmental conditions including seawater salinity and the presence of natural organic macromolecules such as humic substances. Through the presently disclosed methods, nearly 100% oil removal can be achieved within 40-60 minutes of contact with the mixture, in particular embodiments. Finally, the methods are generally resistant to dynamic changes in the environment due to oxidation, sulfidation, aggregation and eco-corona formation.

The nanoparticles are generally formed from a core and polymeric shell, which are each discussed in greater detail below. Referring to FIG. 1, an exemplary nanoparticle 10 is shown having a core 12 surrounded by a polymeric shell 14. Although shown as a spherical nanoparticle 10, it is to be understood that the nanoparticle 10 can take on any suitable shape (e.g., nanoflake, nanorod, etc.).

I. Nanoparticle Core

The presently disclosed methods can be utilized on a variety of different types of nanoparticle cores. The nanoparticle may comprise, for example, natural or synthetic nanoclays (including those made from amorphous or structured clays), inorganic metal oxides, nanolatexes, organic nanoparticles, etc. Particularly suitable nanoparticle cores include inorganic nanoparticles, such as iron oxide, silica, alumina, a titanium oxide, indium tin oxide (ITO), CdSe, etc., or mixtures thereof. Suitable organic nanoparticles include polymer nanoparticles, carbon, graphite, graphene, carbon nanotubes, virus nanoparticles, etc., or mixtures thereof.

The nanoparticle core can, in one embodiment, be a core-shell nanoparticle itself. For example, the nanoparticle core can include a core of a first metal (e.g., a Au core) with a shell of a second metal (e.g., a silver shell).

In one embodiment, the nanoparticle core can be a metal oxide nanoparticle core, such as an iron oxide, silica, an aluminum oxide (e.g., alumina), a copper oxide, a zinc oxide, indium tin oxide, a titanium oxide, nickel oxides, cobalt oxides, or mixtures thereof. Such metal oxides can be in any form of the combination of the metal, oxygen, and optionally another element (e.g., another metal). For example, suitable iron oxides can include iron(II) oxide (FeO), iron(II,III) oxide ($Fe_3O_4$ or $Fe_4O_5$), iron(III) oxide ($Fe_2O_3$), etc. Similarly, suitable titanium oxides can include titanium dioxide ($TiO_2$), titanium(II) oxide (TiO), titanium (III) oxide ($Ti_2O_3$), etc. Likewise, suitable copper oxides can include cuprous oxide ($Cu_2O$), cupric oxide (CuO), etc., Particularly suitable iron oxide nanoparticles, for use as the core in the resulting coated nanoparticle, can have a diameter between about 1 nm and about 100 nm, and can be formed primarily of magnetite ($Fe_3O_4$) and its oxidized form maghemite ($\gamma$-$Fe_2O_3$). Such iron oxide cores have superparamagnetic properties (a.k.a., SPIONs) that can be particularly suitable for certain embodiments.

In one particular embodiment, the core can be magnetic (e.g., a magnetite iron oxide core) to allow for separation/removal/extraction of the nanoparticle from the multiphasic liquid utilizing a magnetic force. Of course, other suitable magnetic materials can be utilized, such as nickel oxides, cobalt oxides, etc.

The core can, in certain embodiments, have an average diameter that about 100 nm or less, such as about 15 nm to about 50 nm. Such a relatively small size can ensure a high surface area for the polymer shell to create sufficient oil adsorption capabilities.

The core can be made up of a single nanoparticle or an agglomeration/aggregation of nanoparticles. As such, the core may have a size of about 15 nm to about 50 nm when relatively few nanoparticles form the core (e.g., 1 to about 10 nanoparticles), or can be larger when the core is formed from a larger agglomeration of nanoparticles (e.g., having a core size of about 50 nm to about 500 nm formed from a plurality of nanoparticles). Agglomeration is increased somewhat in the presence of oil and in high ionic strength solutions. More scientifically, the core can be made of a single crystal (i.e., regular 3D arrangements of atoms), particles (single crystal or multiple crystals), or particles formed from agglomerates or aggregates (weakly and strongly bound).

II. Polymeric Nanoparticle Shell

A polymeric nanoparticle shell is generally positioned around the nanoparticle core, so as to form a core-shell nanoparticle. The polymeric nanoparticle shell can be formed around a core formed from a single nanoparticle or an agglomeration of nanoparticles. In one particular embodiment, the polymeric sheath can have a thickness of about 1 nm to about 50 nm on the core. The polymeric sheath may be chemically bonded to the core, and/or may be mechanically bonded around the core depending on the interaction between the particular polymeric material utilized and the particular core present.

The polymeric nanoparticle shell is generally formed from a polymeric material that comprises at least one polymer. In one embodiment, the polymeric nanoparticle shell can include a polyvinylpyrrolidone-based polymer (e.g., a PVP-based polymer), either alone or in a polymeric matrix with another polymer. For example, a PVP-based polymer can be at least 50% by weight of the polymeric material of the polymeric shell, such as about 75% to 100% by weight. In one embodiment, the PVP-based polymer can be at least 90% by weight of the polymeric material of the polymeric shell, such as about 95% to 100% by weight. The PVP-based polymer can be polyvinylpyrrolidone (PVP) or a polyvinylpyrrolidone derivative having the core backbone based on the PVP polymeric structure.

The PVP-based polymers can have, in particular embodiments, a molecular mass of about 10 kDa to about 360 kDa, with the lower end of the range showing most effective for oil adsorption (e.g., about 10 kDa to about 200 kDa).

The PVP-based polymer can be utilized alone (i.e., without another polymeric material) to form the sheath, or can be utilized in a mixture with another polymeric material. For example, any polymer having aliphatic and aromatic structures similar to hydrocarbons can be mixed with the PVP-based polymer to for the sheath.

In one embodiment, the PVP coating can be formed through a reaction process utilizing an aqueous solvent and at reaction temperatures of less than about 100° C. (e.g., about 60° C. to about 95° C.). The advantages of using the (1) aqueous solvent and (2) the lower reaction temps allows for the reaction to be more environmentally friendly in that no organic solvents are utilized (which also reduces cost).

III. Separation of Oil from the Multiphasic Liquid

A plurality of the nanoparticles, such as those described above, are generally introduced to the multiphasic liquid such that the oil in the multiphasic liquid is allowed to be adsorbed by the polymeric shell of the nanoparticles.

In one embodiment, the nanoparticles can be added into (e.g., floated on, submerged within, dispersed and/or suspended therein, etc.) the multiphasic liquid. Such an introduction of the nanoparticles to the multiphasic liquid can be particularly useful in large, natural bodies of water (e.g., an ocean, gulf, lake, river, groundwater, etc.). For example, a large plurality of nanoparticles can be introduced to an area of an oil spill in a natural body of water. Then, after a sufficient contact time to allow the multiphasic liquid to be adsorbed by the polymeric shell, the nanoparticles can be removed from the multiphasic liquid. For example, the multiphasic liquid can be passed through a filter to remove the nanoparticles. Alternatively, if using a nanoparticle having a magnetic core, the multiphasic liquid can be exposed to a magnetic field to remove the nanoparticles. For example, a magnet can be placed near the multiphasic liquid with the nanoparticles such that the nanoparticles are magnetically attracted to the magnet and removed from the multiphasic liquid. The nanoparticles can also be physically or chemically bound to a surface, such that removal of the surface will remove the nanoparticles and associated oil.

Figure 2:
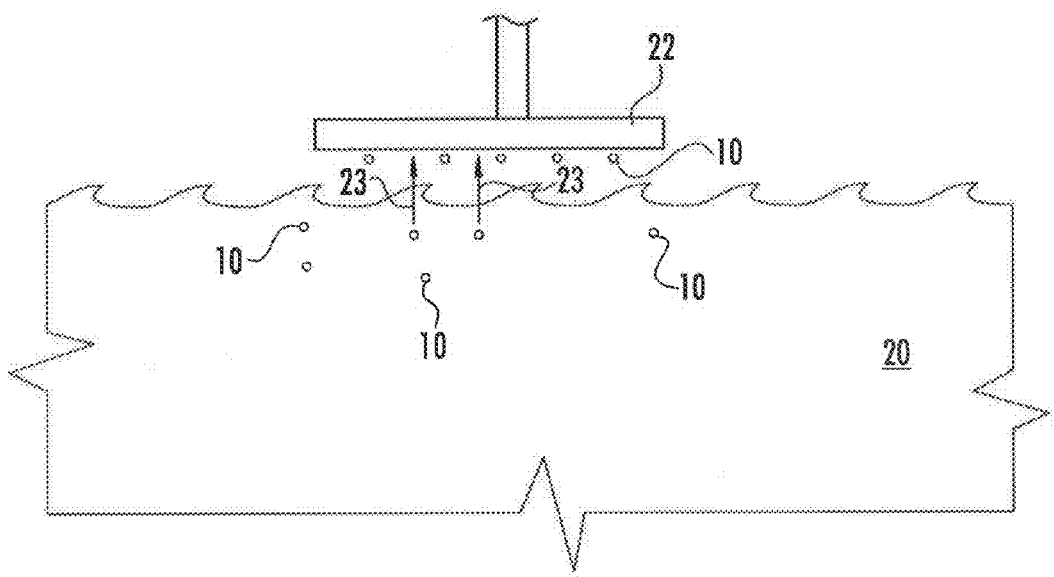
FIG. 2 shows a magnet removing nanoparticles from a multiphasic liquid.

Referring to FIG. 2, an exemplary magnet 22 is shown in close proximity to the multiphasic liquid 22 to remove nanoparticles 10 therefrom, utilizing a magnetic force (shown as arrows 23). Of course, the magnet 22 can be placed into the multiphasic liquid 20 (e.g., on the surface of, submerged under, etc.) to collect the nanoparticles 10 from the multiphasic liquid 22. When utilized in a large body of water (e.g., the ocean, gulf, lake, river, groundwater, etc.), the magnet 22 can be suspended from a boat, helicopter, buoy etc. in order to collect the nanoparticles 10 from the multiphasic liquid 22.

Figure 3:
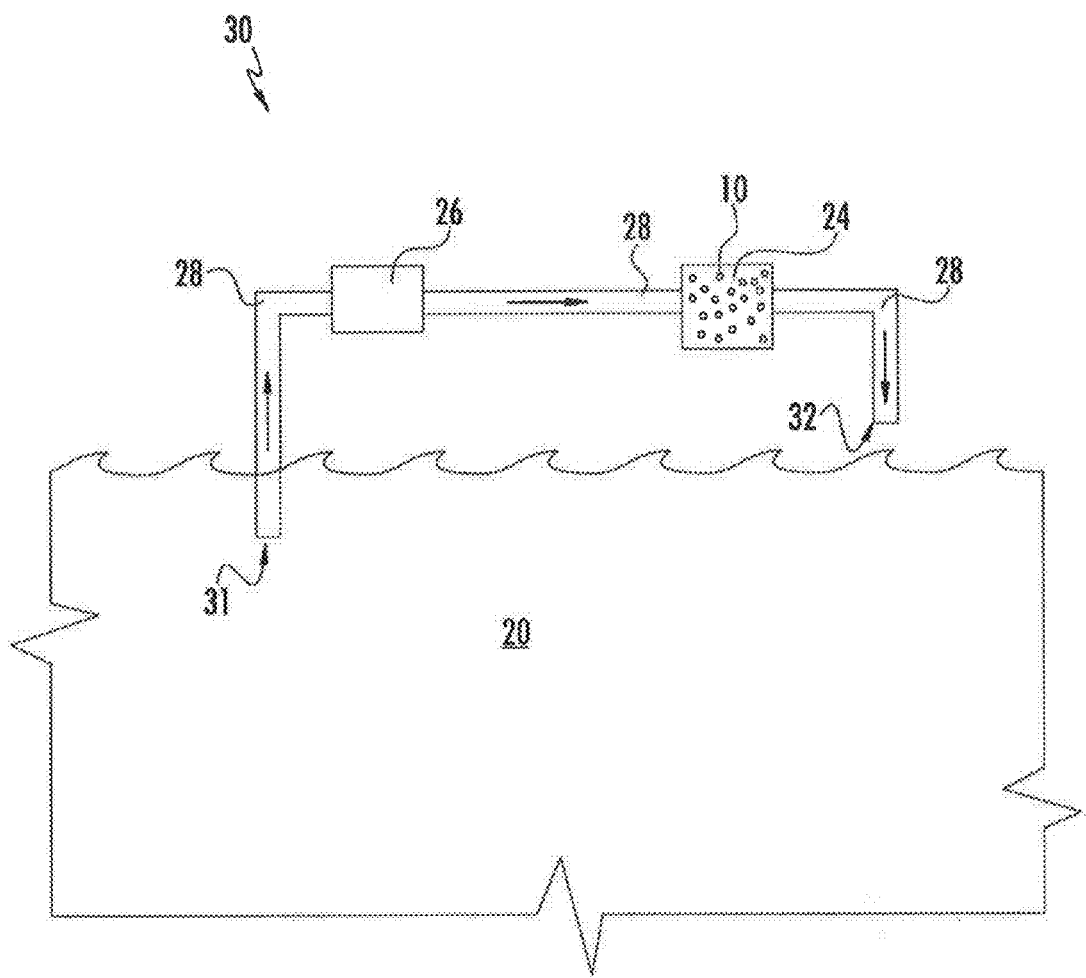
FIG. 3 shows a multiphasic liquid flowing through a cartridge containing nanoparticles.
Figure 4A:
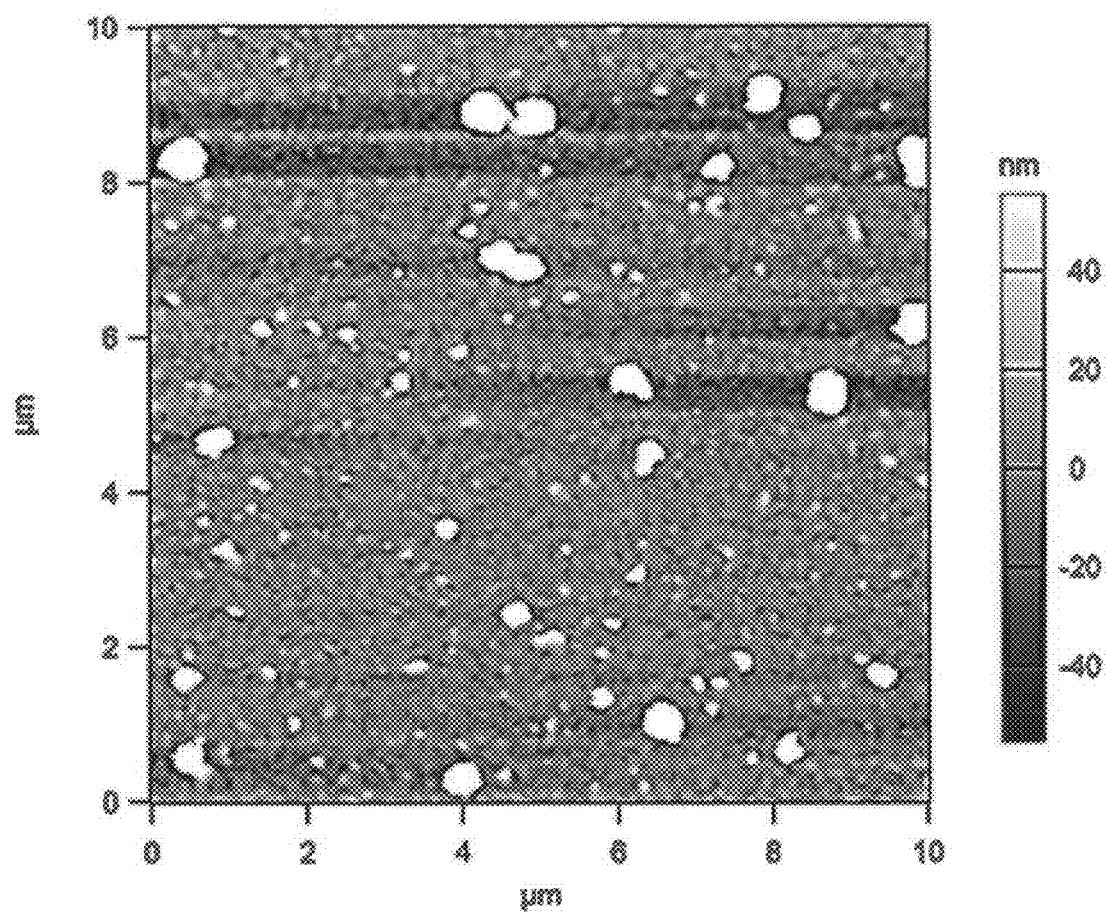
FIGS. 4a, 4b, and 4c show atomic force microscopy (AFM) images of PVP-iron oxide NPs prior to oil-absorption according to the Example 1.
Figure 4B:
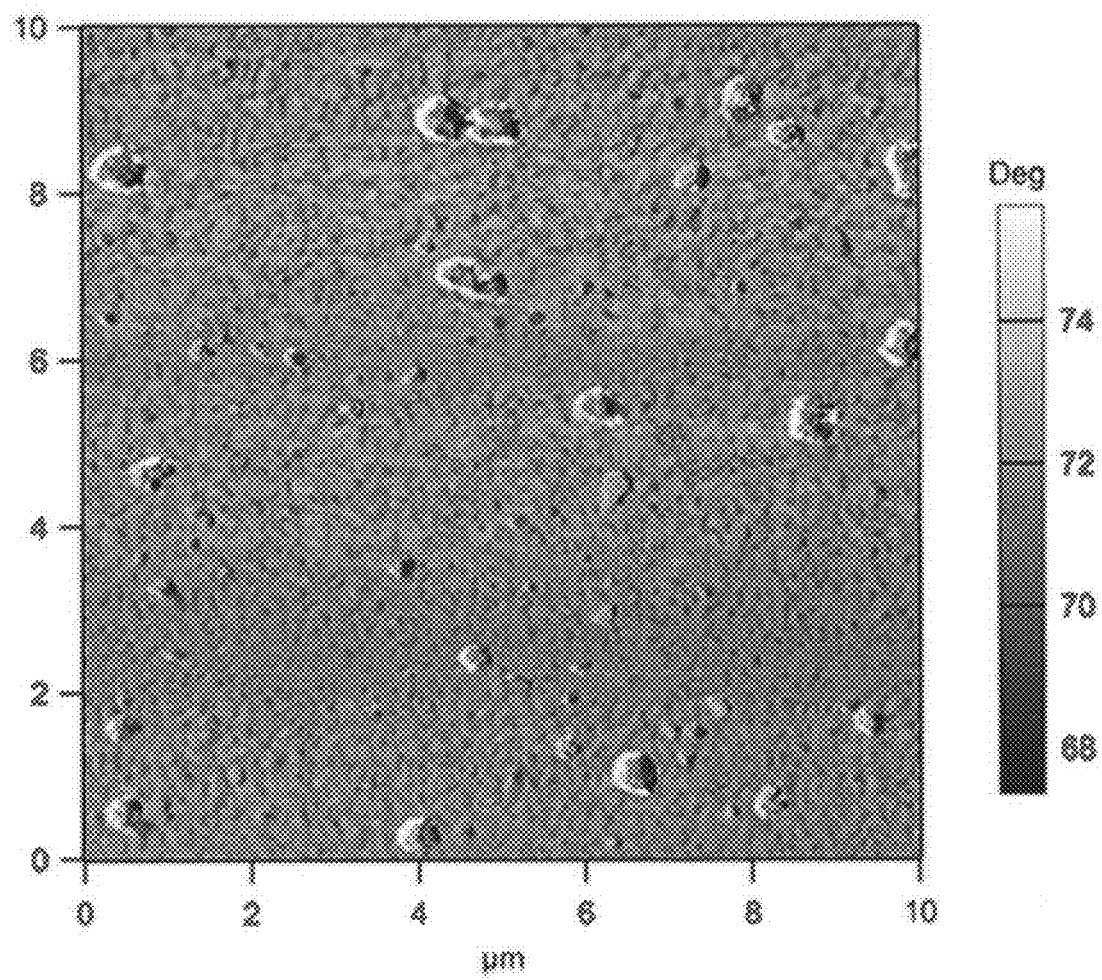
Figure 4C:
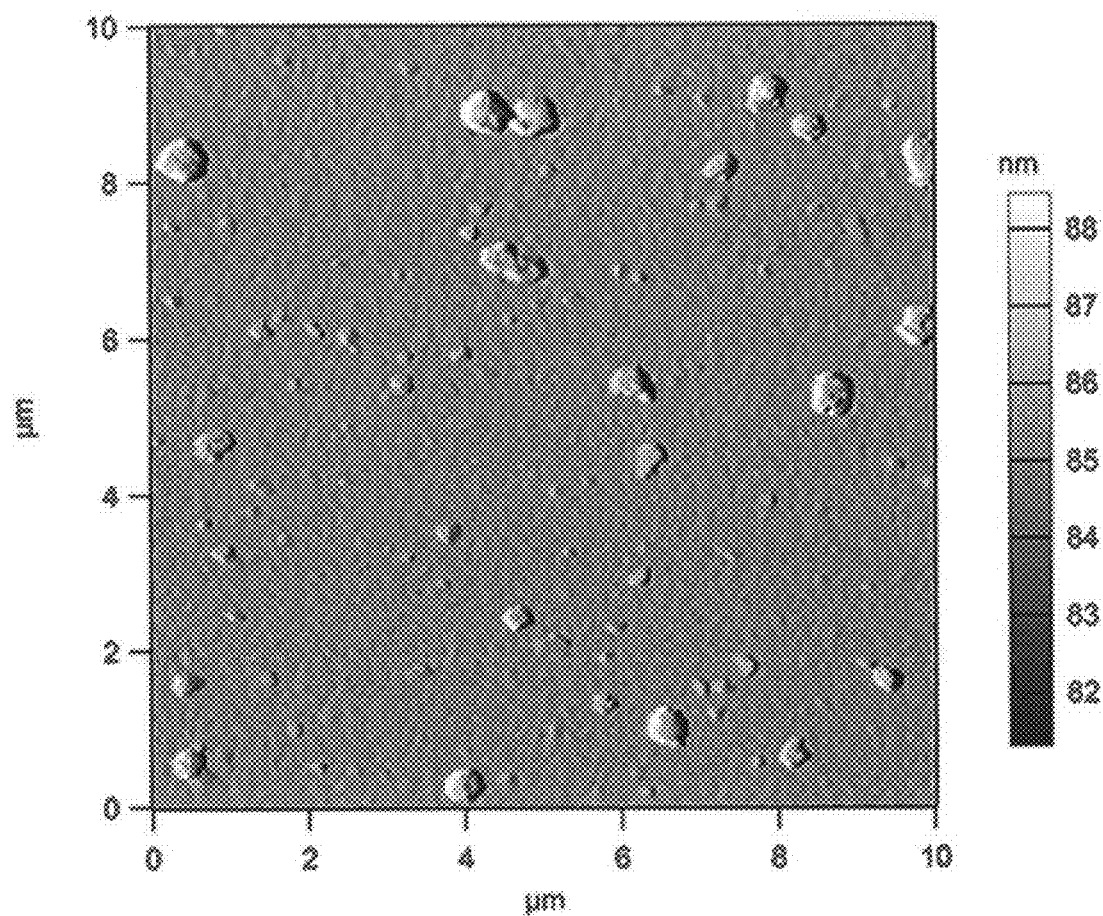
Figure 4D:
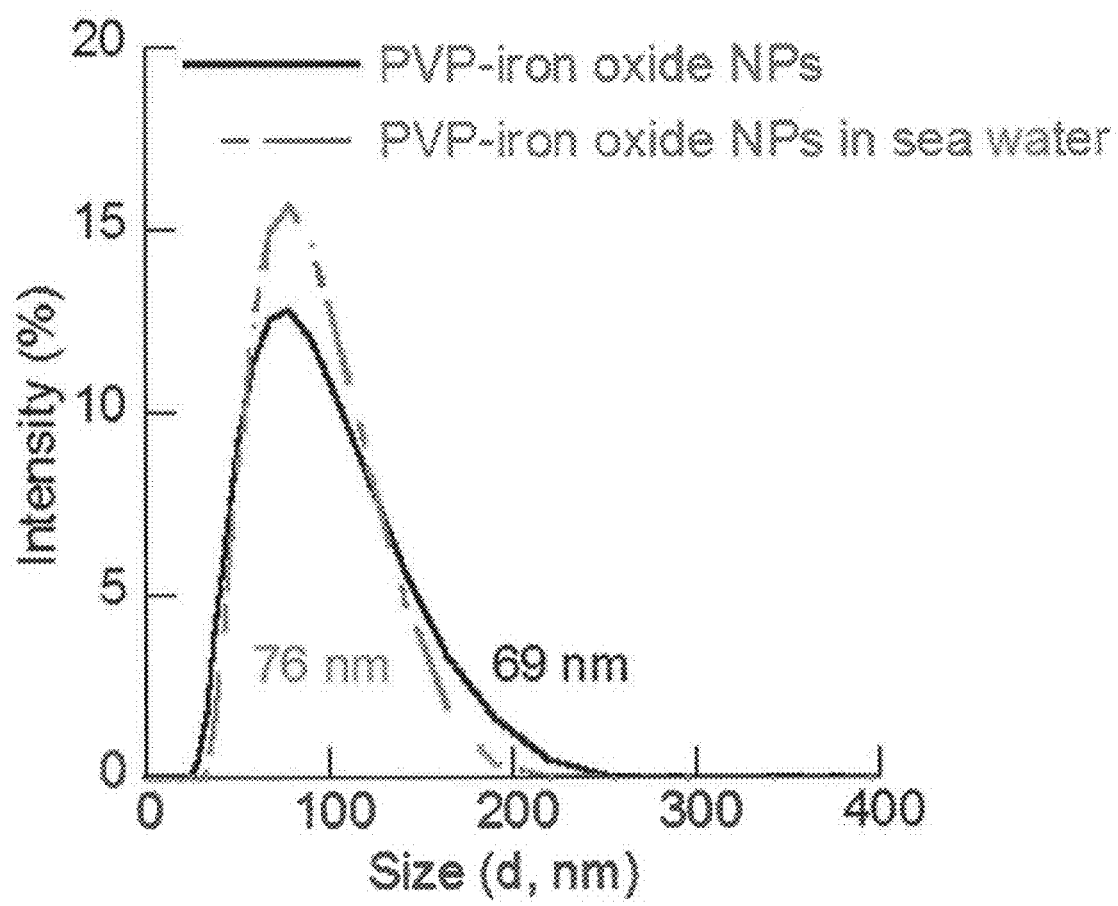
FIG. 4d shows a dynamic light scattering (DLS) plot of PVP-iron oxide NPs prior to oil-absorption according to the Example 1.
Figure 4E:
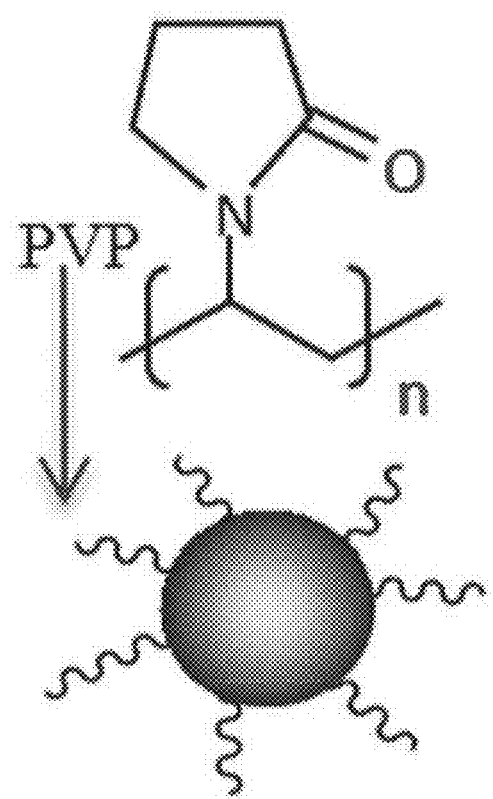
FIG. 4e shows the polymeric repeating structure of PVP attached to an iron oxide core.
Figure 4F:
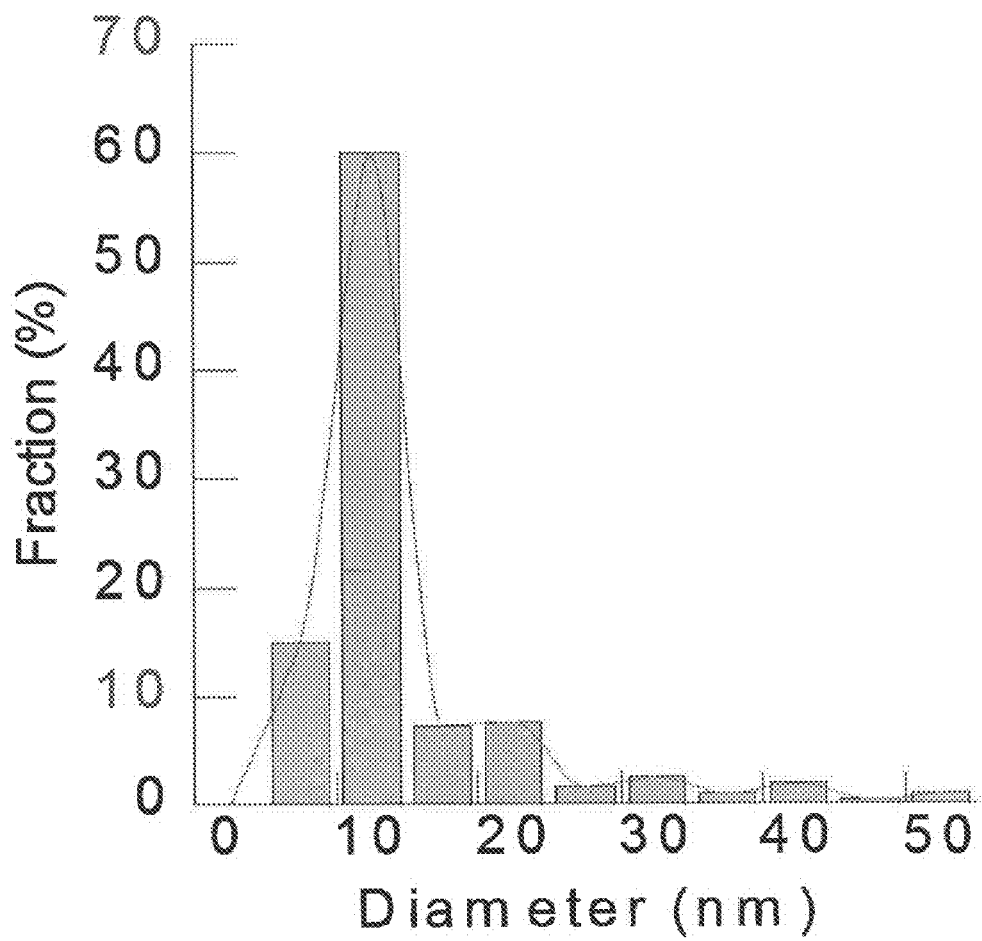
FIG. 4f shows the particle size distribution of PVP-iron oxide NPs after oil absorption according to the Example 1.
Figure 5A:
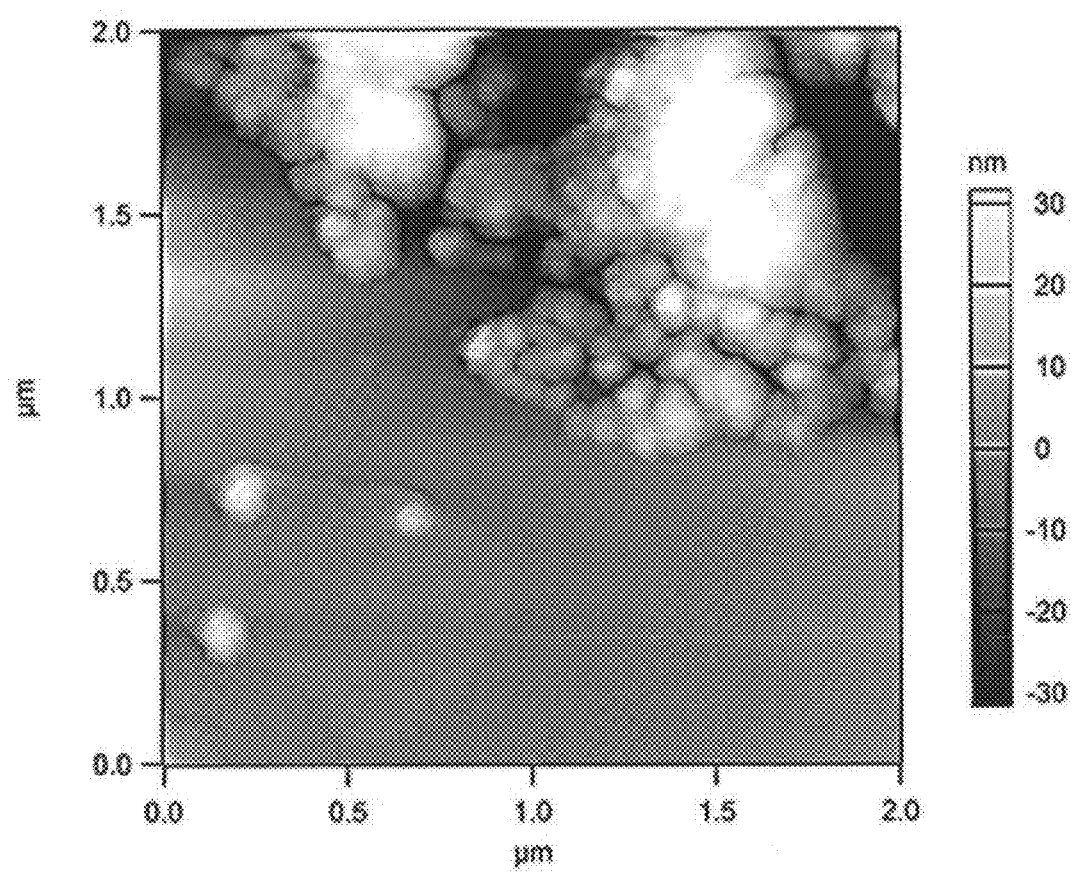
FIGS. 5a, 5b, and 5c show atomic force microscopy (AFM) images of PVP-iron oxide NPs after oil absorption according to the Example 1.
Figure 5B:
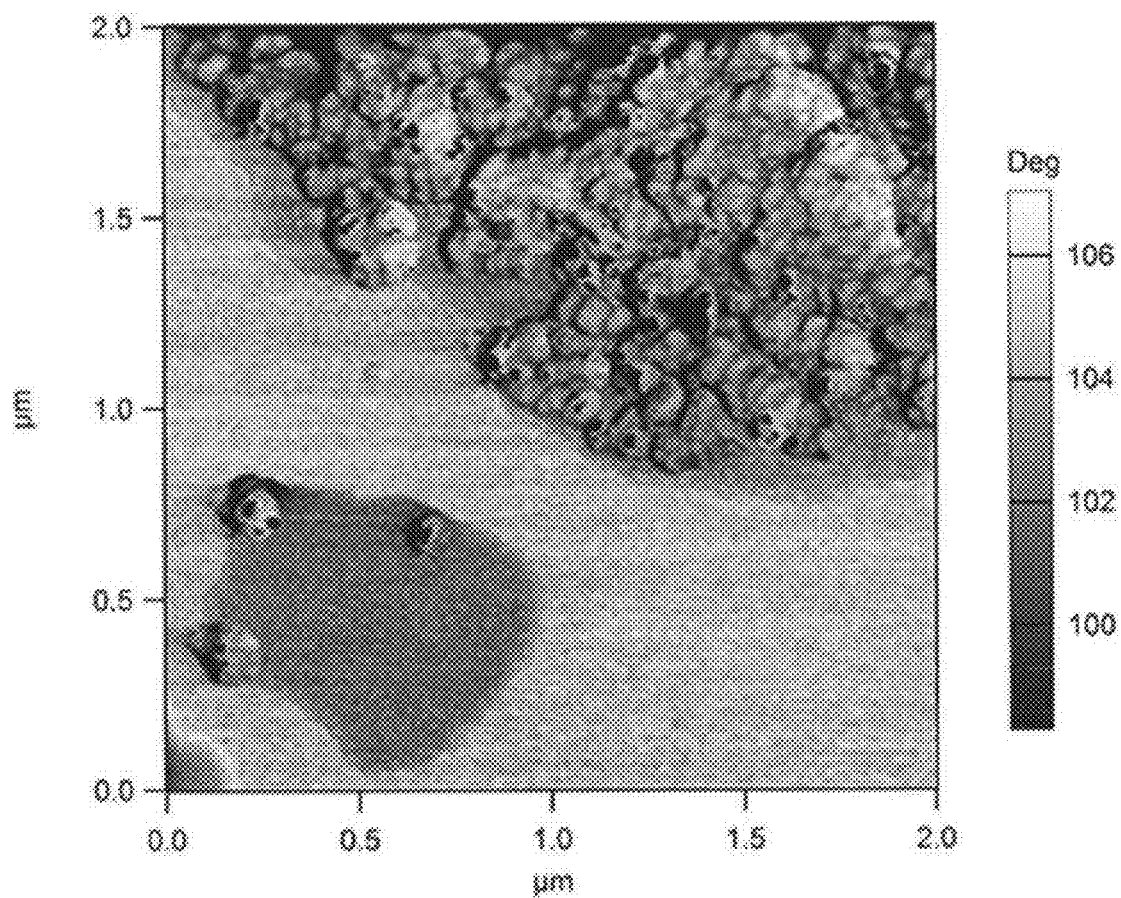
Figure 5C:
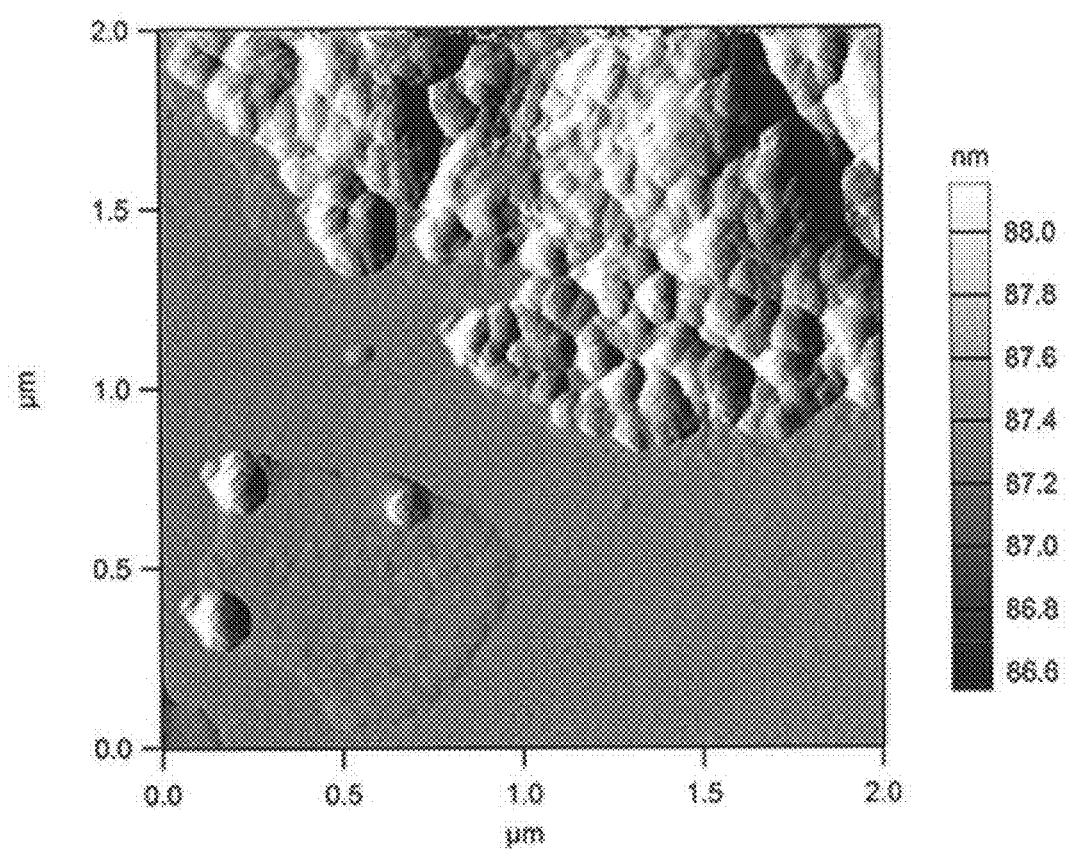
Figure 5D:
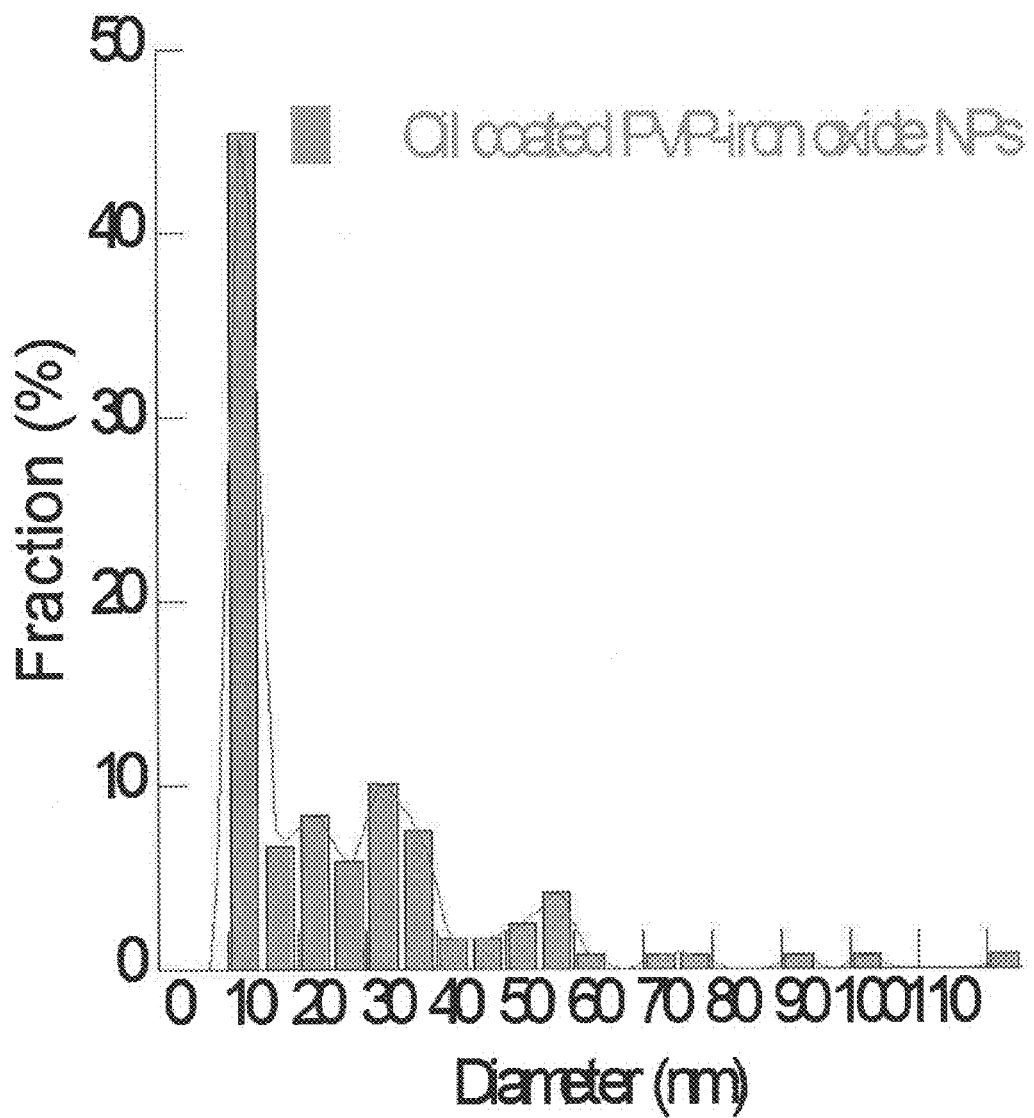
FIG. 5d shows the particle size distribution of PVP-iron oxide NPs after oil absorption according to the Example 1.
Figure 6:
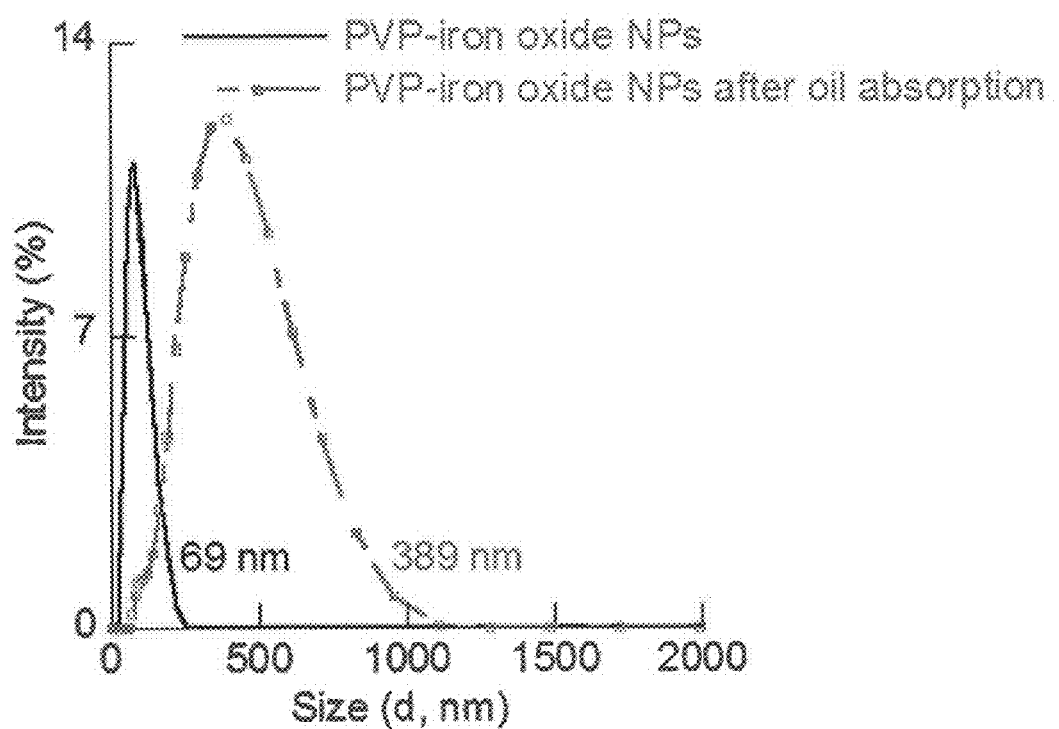
FIG. 6 shows a DLS plot of PVP-iron oxide NPs prior to and after oil-absorption according to the Example 1.
Figure 7A:
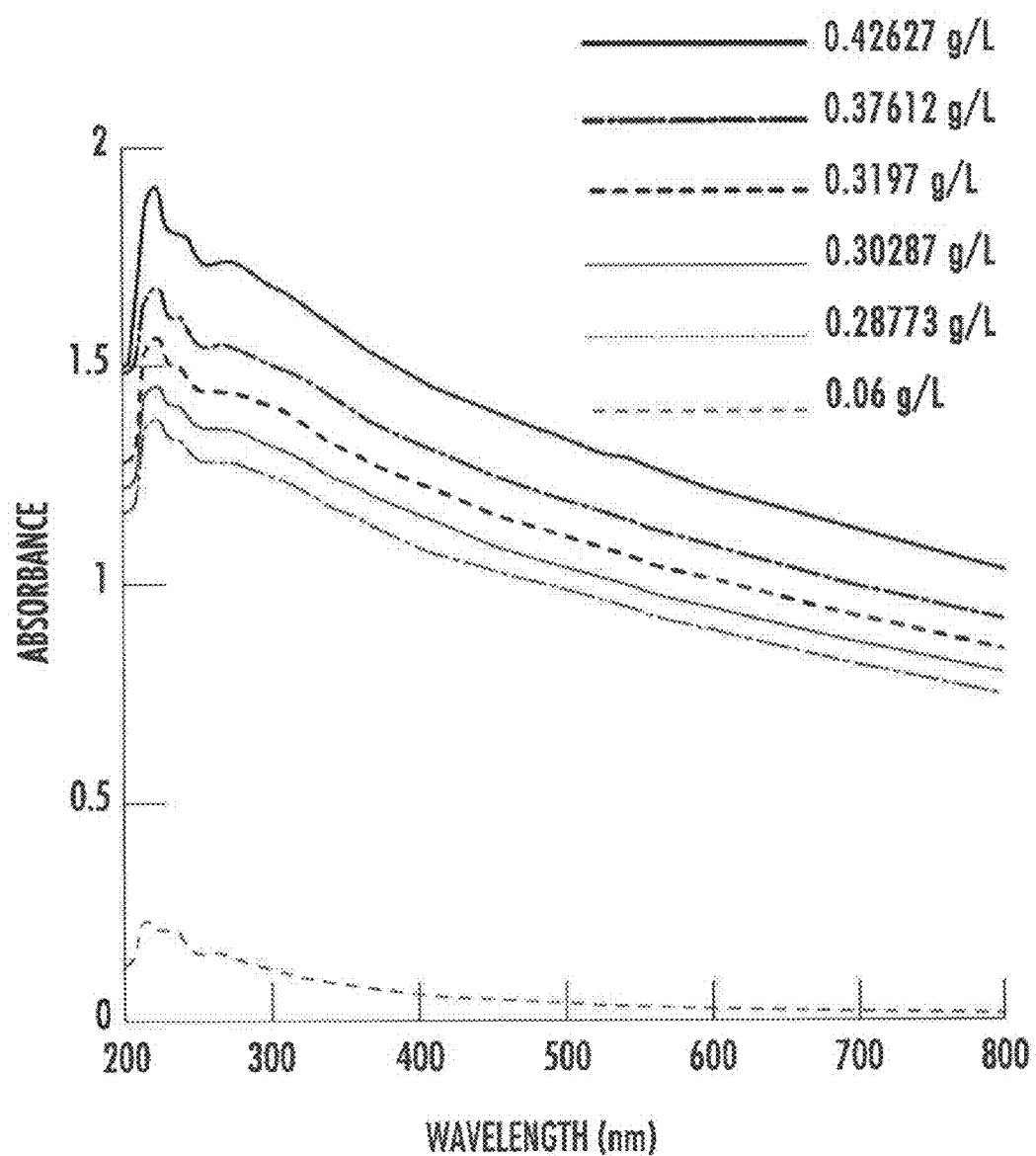
FIGS. 7a, 7b, 7c, and 7d show UV results showing oil removal with PVP-iron oxide NPs according to Example 1.
Figure 7B:
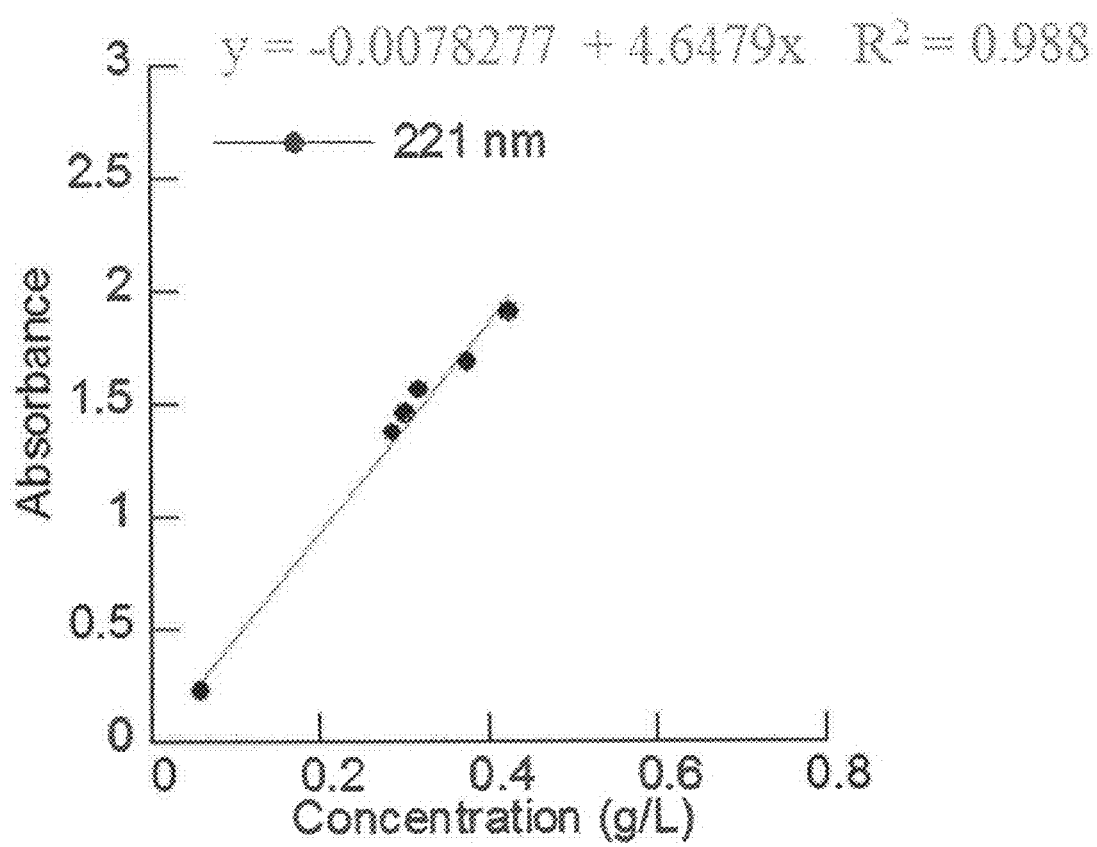
Figure 7C:
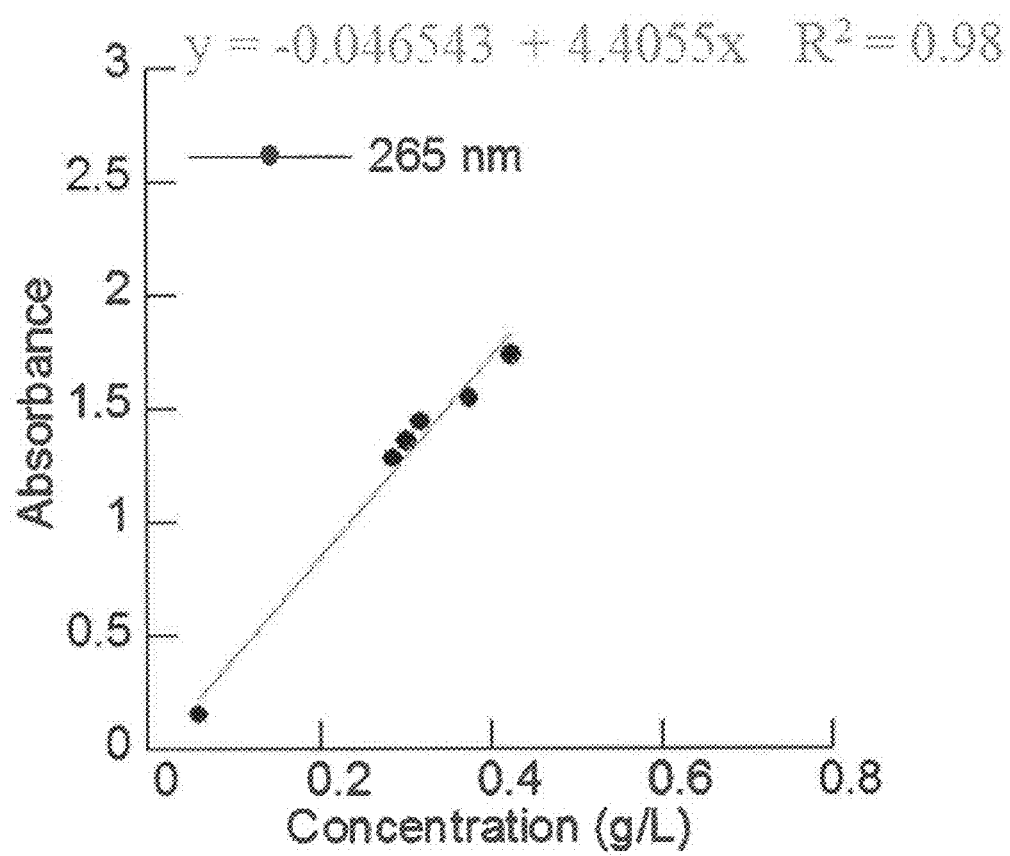
Figure 7D:
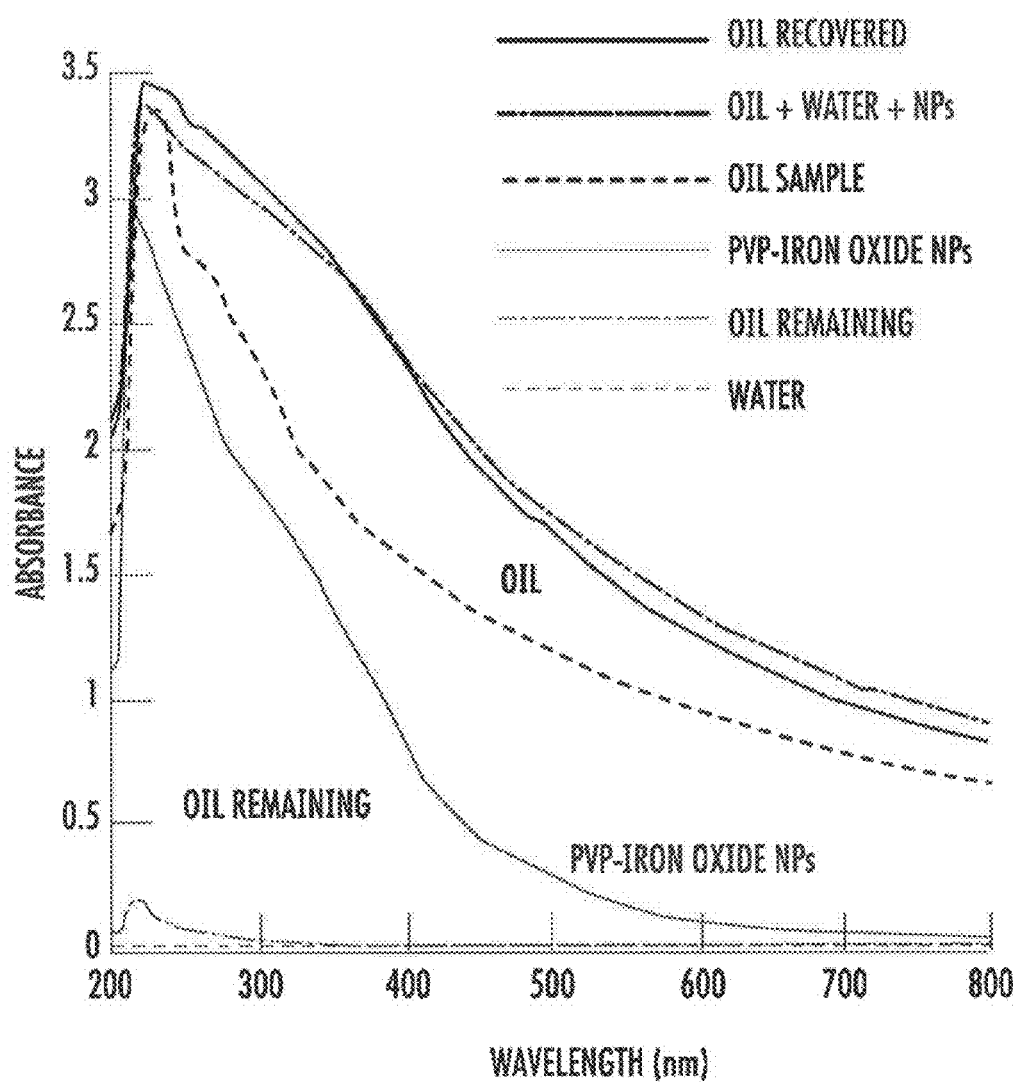

In an alternative removal method, the multiphasic liquid can be passed through a cartridge containing a plurality of the nanoparticles. Referring to FIG. 3, an exemplary system 30 is shown flowing the multiphasic liquid 20 through a cartridge 24 containing the nanoparticles 10. In the exemplary system 30 shown, The multiphasic liquid 20 is generally pumped into an inlet 31 through the piping 28 (utilizing a pump 26) through the cartridge 24 and returned to the multiphasic liquid 20 via outlet 32.

IV. Recovering the Oil Adsorbed by the Polymeric Shell

The oil adsorbed from the multiphasic liquid can be recovered from the collected nanoparticles after removal from the multiphasic liquid. For example, a sonication or solvent extraction method can be utilized to remove the oil from the collected nanoparticles, which indicates that the oil is held by the PVP-based polymer through non-covalent bonding.

Example 1

Generally, the oil sorption efficiency of PVP-coated iron oxide nanoparticles (NPs) was examined. Compared to the sophisticated fabrication methods, the PVP-iron oxide NPs were synthesized with inexpensive reactants of low toxicity under ambient air. The NPs were systematically evaluated for oil removal via multi-method characterizations. Particularly, surrogate oil samples (MC252 surrogate oil was purchased from BP (Aecom Environment)), which is similar to the oil from the Deepwater Horizon spill, was chosen for this study. The research results will be interesting for developing smart materials to treat oil spill. The PVP-iron oxide NPs could open the route for an easily scalable and benign oil remediation technique.

Typically, polymer coated or sterically stabilized NPs have been shown to remain unaffected in changing environmental milieu. Polyvinylpyrrolidone (PVP) is one such polymer shown to be highly stable under different pH and ionic strengths. Recently, PVP-stabilized NPs showed best temporal stability in terms of aggregation and dissolution changes in the exposure studies. (See, Tejamaya and Romer references).

Low-cost polymer coated iron oxide nanoparticles, about 20 nm in size, were made using hydrothermal methods which have been characterized by their physico-chemical properties. Their ability to remove oil from oil water mixtures was investigated at the bench scale (ca 100 ml); quantitative removal was achieved, dependent on nanomaterial type, contact time and other factors. Removal in synthetic marine waters was achieved and at concentrations equivalent to or higher than likely oil concentrations from discharges and spills commonly encountered. Oil regeneration is possible. Magnetic separation is possible.

Materials and Methods

Chemicals

All chemicals were purchased commercially and used without further purification. These included: iron (III) acetyl acetonate (Fe(acac)$_3$, 99%, Acros Organics), tri-ethylene glycol (99%, Alfa Aesar), polyvinyl pyrrolidone (PVP, 10 kDa, GBiosciences), PVP (40 kDa, Sigma-Aldrich), calcium chloride, dihydrate (CaCl$_2$.2H$_2$O, BDH), magnesium chloride (MgCl$_2$.6H$_2$O, BDH), sodium chloride (NaCl, BDH), methyl tert-butyl ether (MTBE, >99%, Sigma-Aldrich), and ethanol (90%, BDH). MC252 surrogate oil was purchased from BP (Aecom Environment).

Synthesis of PVP-Iron Oxide Nanoparticles

Iron oxide NPs were synthesized using a modified polyol method. Specifically, the capping molecule, PVP (10 kDa, 0.03 mmol) was heated to dissolution in triethylene glycol (1 mL) at 90° C. for 10 min. The iron precursor, Fe(acac)$_3$ (2 mmol, 0.7 g) was added to this solution and mixed for 10 min, prior to thermal decomposition at 260° C. for 1 h. The entire synthesis was conducted in air without inert gas protection.

To study the effect of PVP coating on oil sorption, the iron oxide NPs were synthesized with different precursor-to-capping agent molar ratios (e.g., 66.7:1, 22.2:1, and 12.5:1) and with a different PVP polymer (M$_W$ 40 kDa and 360 kDa, 0.03 mmol), keeping all other parameters the same. Additionally, to investigate the influence of NP size on oil removal, different reaction times (e.g., 1 and 2 h) were used, keeping all other conditions the same.

The as-synthesized NPs were magnetically collected and redispersed in ultra-pure water (Milipore) to remove excess solvent. The target concentration of NPs was set to 20 g/L. The aqueous NP products were subsequently used for oil removal studies.

Oil Removal with PVP-Iron Oxide Nanoparticles

In a typical oil removal experiment, the purchased surrogate oil (see above) was with water and synthetic seawater. For example, the surrogate oil was mixed well with ultra-pure water (Milipore) in a vial via sonication (Branson 2800, 40 kHz, ambient conditions) for 30 min to prepare the oil samples. PVP-iron oxide NPs were added to the oil samples at target oil:NP weight ratios of 1.4:1, 2.6:1, 4.3:1, 6:1, and 7.3:1, respectively. To investigate the oil extraction capacity of the NPs, the oil-NP solutions were magnetically separated for different time periods (12 h and 72 h) using a 1" cubic magnetic GEM™ collector. The remaining clear solutions in each vial were collected via pipettes for subsequent analysis to quantify the amount of oil removed. The oil-coated NPs magnetically collected to the side of the vial were sonicated in ultra-pure water (Milipore) for oil recovery. The oil sample, oil-coated NPs, and the final clear solution batches were further characterized via analytical methods like UV-visible spectroscopy (UV-vis), gas chromatography (GC/MS), fourier transform infra-red spectroscopy (FTIR), and atomic force microscopy (AFM) imaging to estimate oil removal.

Quantification of Oil Removal and Characterization

The hydrodynamic size and zeta potential of PVP-iron oxide NPs and oil coated PVP-iron oxide NPs were measured on a Malvern Zetasizer Nano dynamic light scattering (DLS). Three consecutive measurements were recorded at 25° C. to calculate a Z-average size for each sample. To test the stability of PVP-iron oxide NPs, artificial sea water (composition in parts per thousands: 10.710 Na, 0.419 Ca, 1.304 Mg, and 19.35 Cl) was prepared from CaCl$_2$.2H$_2$O, MgCl$_2$.6H$_2$O, and NaCl in ultrapure water (Milipore). The NPs were sonicated (Branson 2800, 40 kHz, ambient conditions, 15 min) with artificially prepared sea water (pH 5.5) and left undisturbed for 1 day. The hydrodynamic diameter and zeta potential of the NP dispersions in artificial sea water were subsequently measured on the DLS.

The size and morphology of the PVP-iron oxide NPs before and after oil absorption were examined on an Asylum Cypher AFM operating in non-contact mode in dried air. Noncontact mode silicon AFM cantilevers (ACM240™, Olympus) were used for the characterization. Data collection and analysis were conducted with Asylum software package. Samples were carefully prepared via an adsorption technique. Specifically, the sample solutions (~50 μL) were dropped on freshly sliced mica slides via micro-pipettes and washed with ultra-pure water, prior to drying in an enclosed vial to prevent airborne contamination.

A Shimadzu 2600 UV-vis was used to measure the concentration of oil in the different samples, based on the absorbance spectra. First, a calibration plot was obtained with known concentrations of oil (e.g., 0.06, 0.1, 0.15, 0.2, 0.25, 0.28773, 0.3, 0.30287, 0.3197, 0.37612, and 0.42627 g/L). Second, the absorbance peaks for xylene (aromatic), toluene (aromatic), and hexane (aliphatic) references were recorded to identify the aliphatic and aromatic peaks of oil. Finally, the UV spectra were carefully measured for the initial oil-water samples, NPs samples used for oil studies, oil-water-NP solution samples, oil recovery samples after sonication of oil-coated NPs, and the final separated solution samples. Based on the height of absorbance peaks for the different samples and the calibration plot, the oil removal efficiency could be quantified. Additionally, pictures were taken for each sample prior to UV measurement.

The concentrations of oil samples before and after the NP-based separation were further measured on a VG 70S GC/MS for reliability. The samples were prepared via extraction in MTBE (1 mL). The chromatogram oven was operated from 60° C. to 300° C. rising at 10° C./min. Compounds were separated on a Restek RTx-5 (length 30 m, 0.25 mm ID, and 0.2-mm film). The electron impact ionization was set at 70 eV with a helium carrier gas at 10 psi operating pressure. An injection volume of 1 μL was used. Ion chromatograms were recorded for mass-to-charge ratios (m/z) of 208 to 370.

Figure 8A:
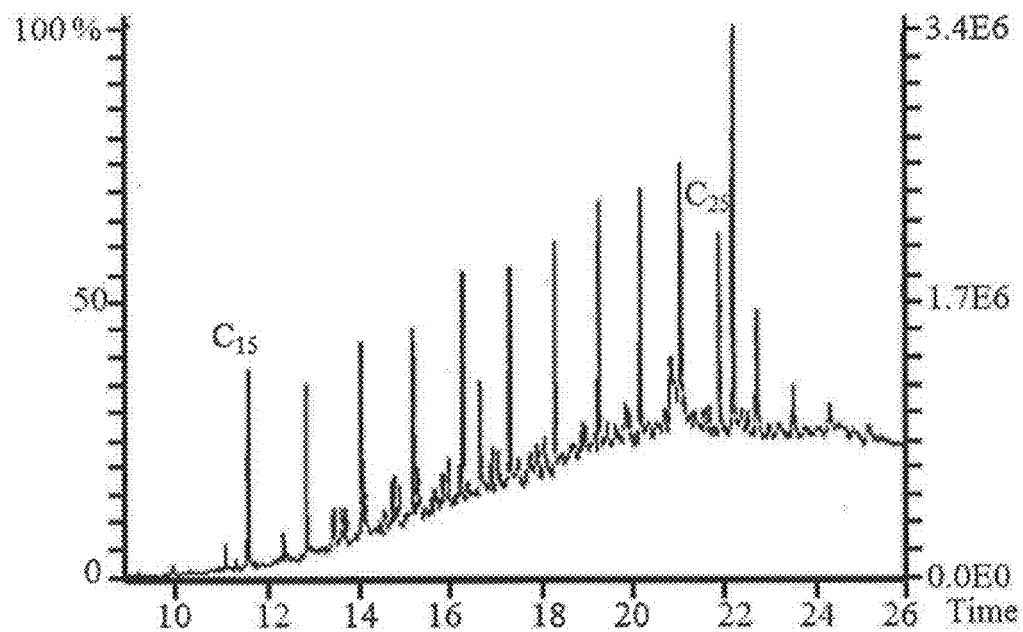
FIGS. 8a and 8b show GC results showing oil removal with PVP-iron oxide NPs according to Example 1.
Figure 8B:
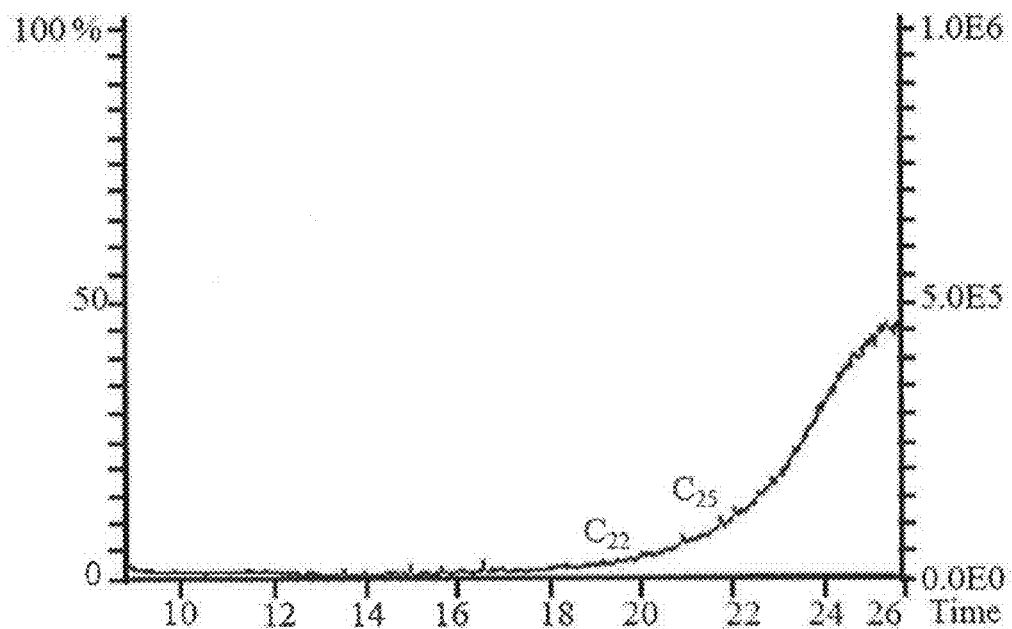
Figure 9A:
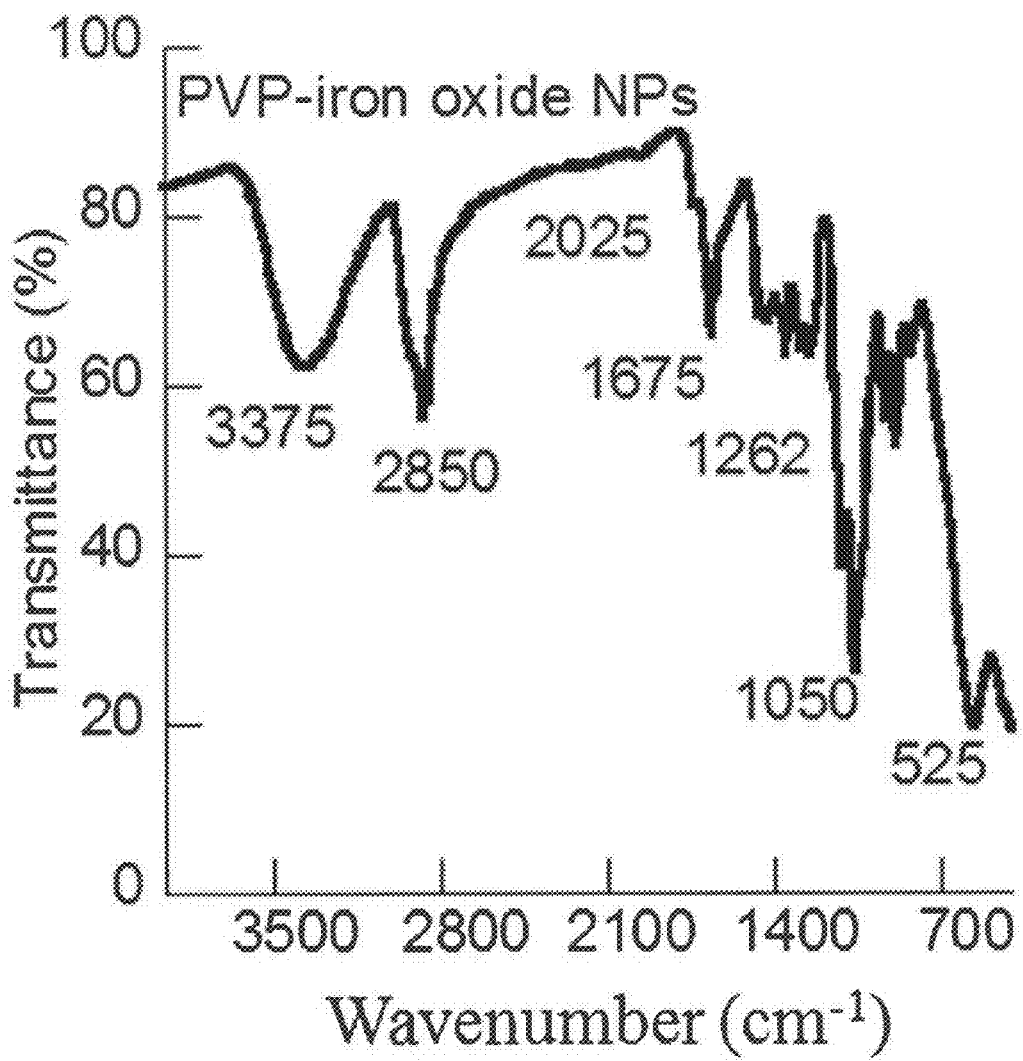
FIGS. 9a and 9b show FTIR results showing oil removal with PVP-iron oxide NPs according to Example 1.
Figure 9B:
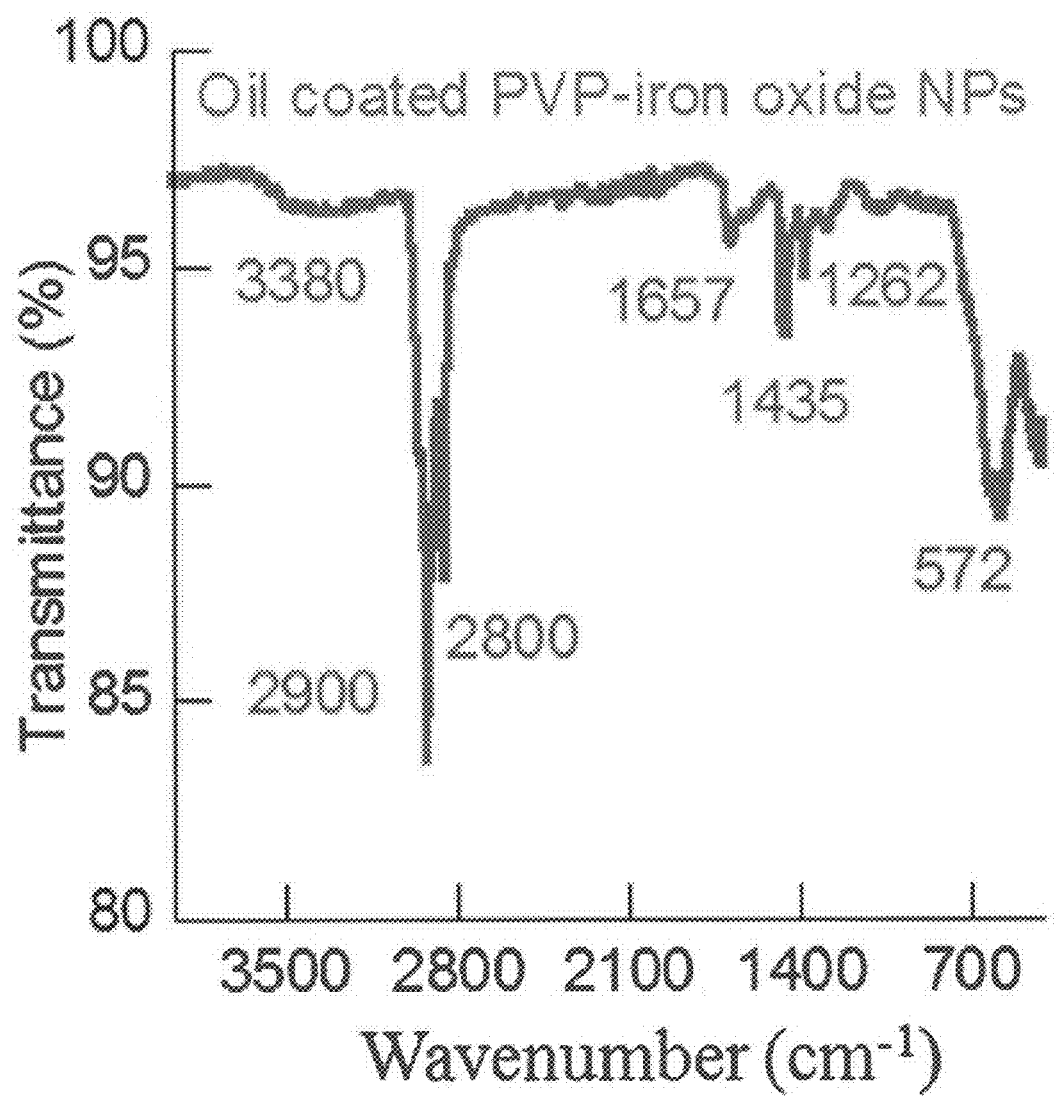
Figure 10:
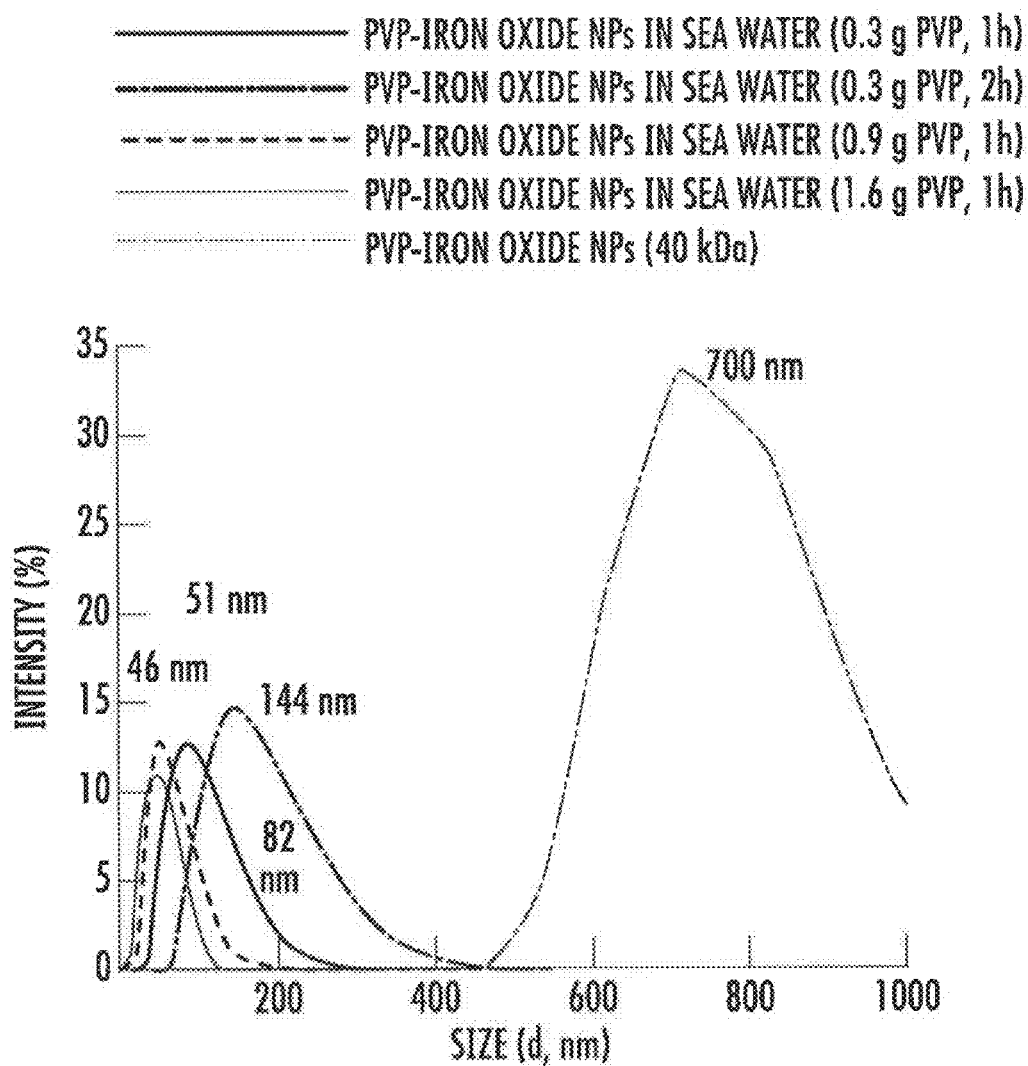
FIG. 10 shows the different PVP-iron oxide NPs tested for oil removal, according to Example 1.
Figure 11:
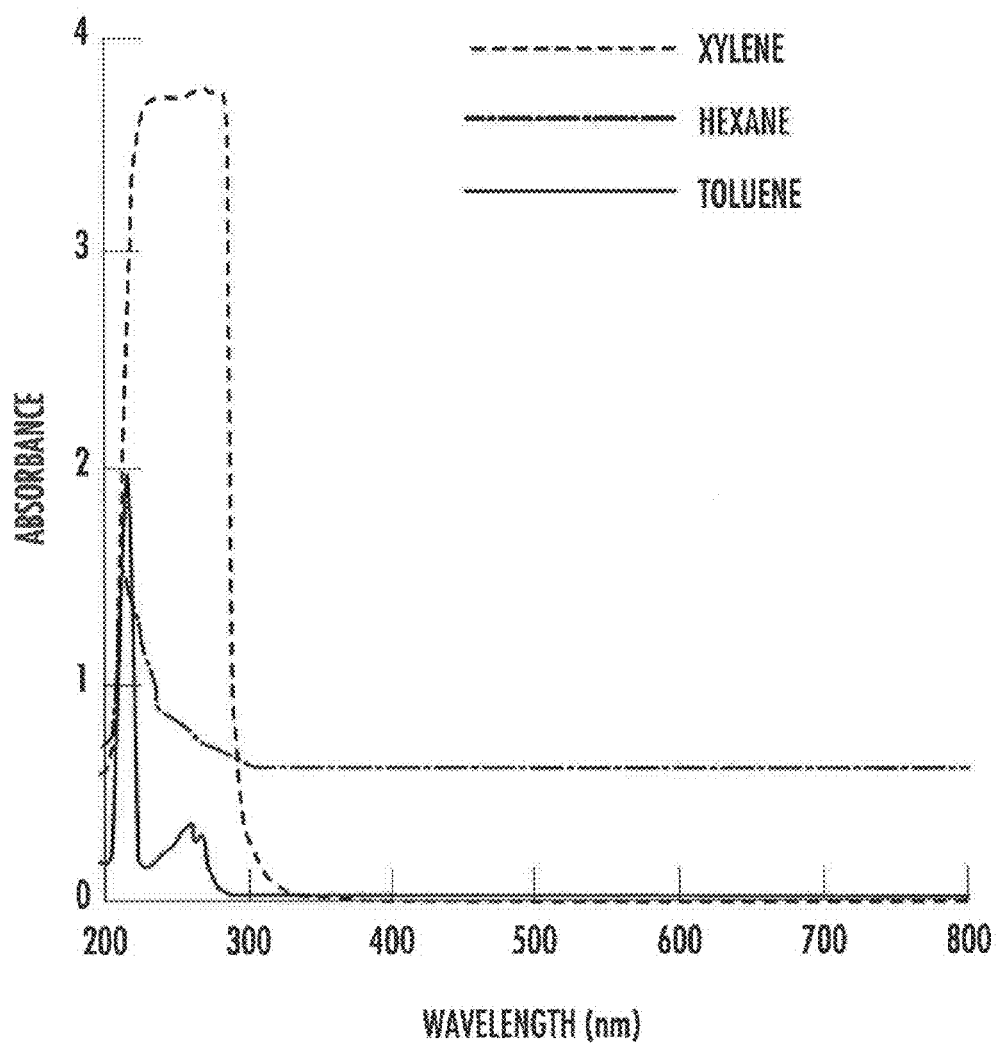
FIG. 11 shows the UV absorbance of aliphatics and aromatics.

The data collected from the exemplary separations is attached and shown in FIGS. 4-11 and Tables 1 and 2. In particular, these Figures show the size and size distributions of exemplary nanoparticles and exemplary nanoparticle-oil mixtures using atomic force microscopy and dynamic light scattering. The data shows that larger sizes for DLS and are much larger after oil sorption (see e.g., FIG. 6a). FIG. 8 shows gas chromatograms showing loss of oil in water mixture (after MTBE extraction) upon exposure to nanoparticles. Table 1 shows removal of oil in oil water mixtures for a variety of exemplary experiments:

TABLE 1

Oil removal efficiency at different conditions (typically much higher than environmental samples) with quantitative removal under a number of conditions

| Wt. of NPs (mg) | Oil conc. (g/L) | % Removal |
|---|---|---|
| 128.6 | 0.94 | 71.8 |
| 145.6 | 0.87 | 73.1 |
| 206.6 | 0.90 | 71.7 |

TABLE 1-continued

Oil removal efficiency at different conditions (typically much higher than environmental samples) with quantitative removal under a number of conditions

| Wt. of NPs (mg) | Oil conc. (g/L) | % Removal |
|---|---|---|
| 307.6 | 0.80 | 100 |
| 623.9 | 0.89 | 100 |
| 151.3 | 0.90 | 63.4 |
| 151.9 | 0.67 | 97.5 |

Table 2 shows the removal of 99-100% of C$_{15}$-C$_{25}$ molecules using 307.8 mg of the 'small' PVP-iron oxide NPs (0.8 g/L oil). As shown in Table 2, the % oil remaining is 0-1% (i.e., 99-100% removal of oil). All samples were extracted in 1 mL MTBE before GC analysis.

TABLE 2

Oil Removal

| Aliphatics | Oil sample (area) | Oil remaining (area) | Percentage of oil remaining = (Oil remaining/Oil sample) * 100 |
|---|---|---|---|
| C25 | 7.23E+05 | 7.24E+03 | 1.00 |
| C22 | 1.26E+06 | 8.31E+03 | 0.66 |
| C18 | 1.85E+06 | 0.00E+00 | 0.00 |
| C15 | 2.23E+06 | 0.00E+00 | 0.00 |

Example 2

In addition to the solvothermal method above, a hydrothermal synthesis has also been used. Additionally, lower reaction temperatures were utilized that were below 100° C. (e.g., about 60° C. to about 95° C.), no organic solvents and along with the ambient atmosphere. Thus energy and material inputs were reduced.

Ferric chloride and ferrous chloride are used as precursors (currently in 4:1 ratio, but also in 3:2 ratio) and ammonium hydroxide as the precipitation agent. Approximately 2 g of PVP, a water soluble polymer, was dissolved in deionized water at 90° C. with stirring for 10 min. in a conical flask. Then, FeCl$_2$.4H$_2$O and FeCl$_3$.6H$_2$O are added to the mixture, with stirring for 10 mins. at same temperature. Again, approximately 2 g PVP was added and stirred for 5 more minutes followed by ammonium hydroxide solution drop wise with vigorous stirring at 90° C. typically for 25 min., until the color of the mixture turned from yellow to black. After the synthesis is completed, the iron oxide NPs are washed using magnetic separation 2-33 times in DI water with 2 minutes of sonication each time.

Experimental:

The current synthesis technique is a low temperature hydrothermal synthesis in aerobic environment. Ferric chloride (FeCl$_3$.6H$_2$O) and ferrous chloride (FeCl$_2$.4H$_2$O) were used as precursor materials, and ammonium hydroxide was used as the precipitation agent. In a typical synthesis process, 1812 mg of PVP, a water soluble polymer was dissolved in 6.25 ml of deionized (DI) water at 80° C. stirring for 10 min. in a 3 neck round bottom flask. Then, 1 mmol (198.8 mg) of FeCl$_2$.4H$_2$O and 4 mmol (1081.2 mg) of FeCl$_3$.6H$_2$O were added in the mixture and the mixture was stirred for 10 minutes at the same temperature. Another batch of 1198 mg of PVP was then added and stirred for 5 more minutes to dissolve it completely. It was followed by addition of ammonium hydroxide solution drop wise with vigorous stirring at 90° C. The mixture turned black immediately after the addition of ammonium hydroxide and the reaction was continued typically for 25 min.

After the synthesis completed, the iron oxide NP's were washed magnetically for several times in DI water. In a typical washing process, about 4 drops of NP's solution were added to the 4 ml of DI water in a vial and the mixture was ultrasonicated for 2 minutes. Then, the vial containing NP's solution was placed in contact with a block magnet and NP's were drifted along the magnetic field separating the remaining DI water and other non-magnetic materials. The process was repeated several times as required.

Figure 12A:
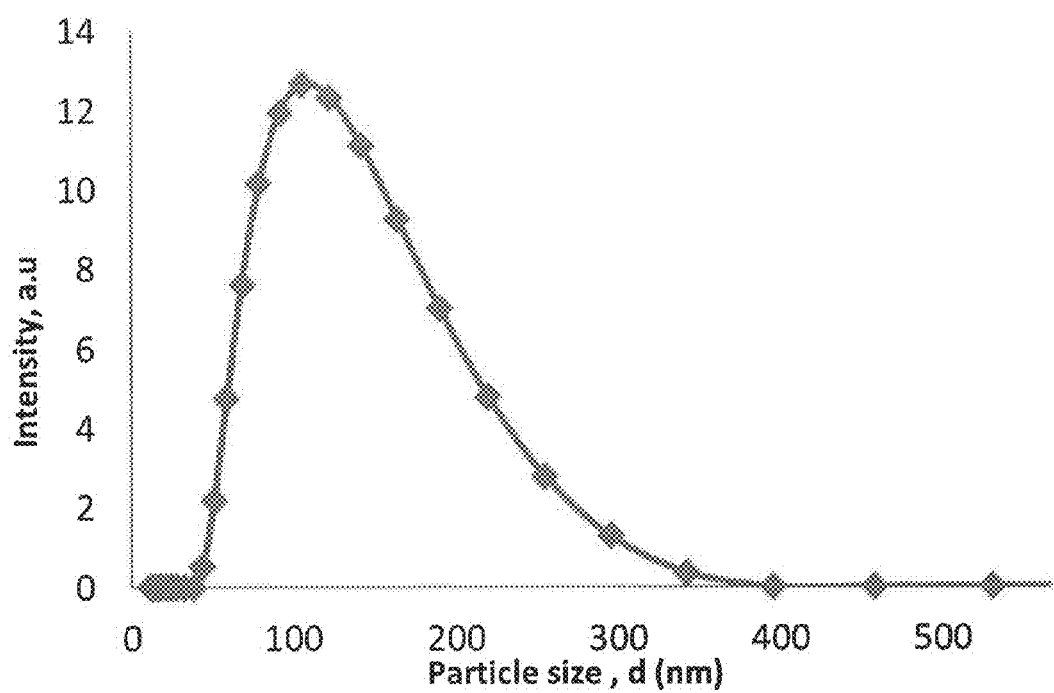
FIG. 12a shows a DLS plot after two washing of NP's according to Example 2.
Figure 12B:
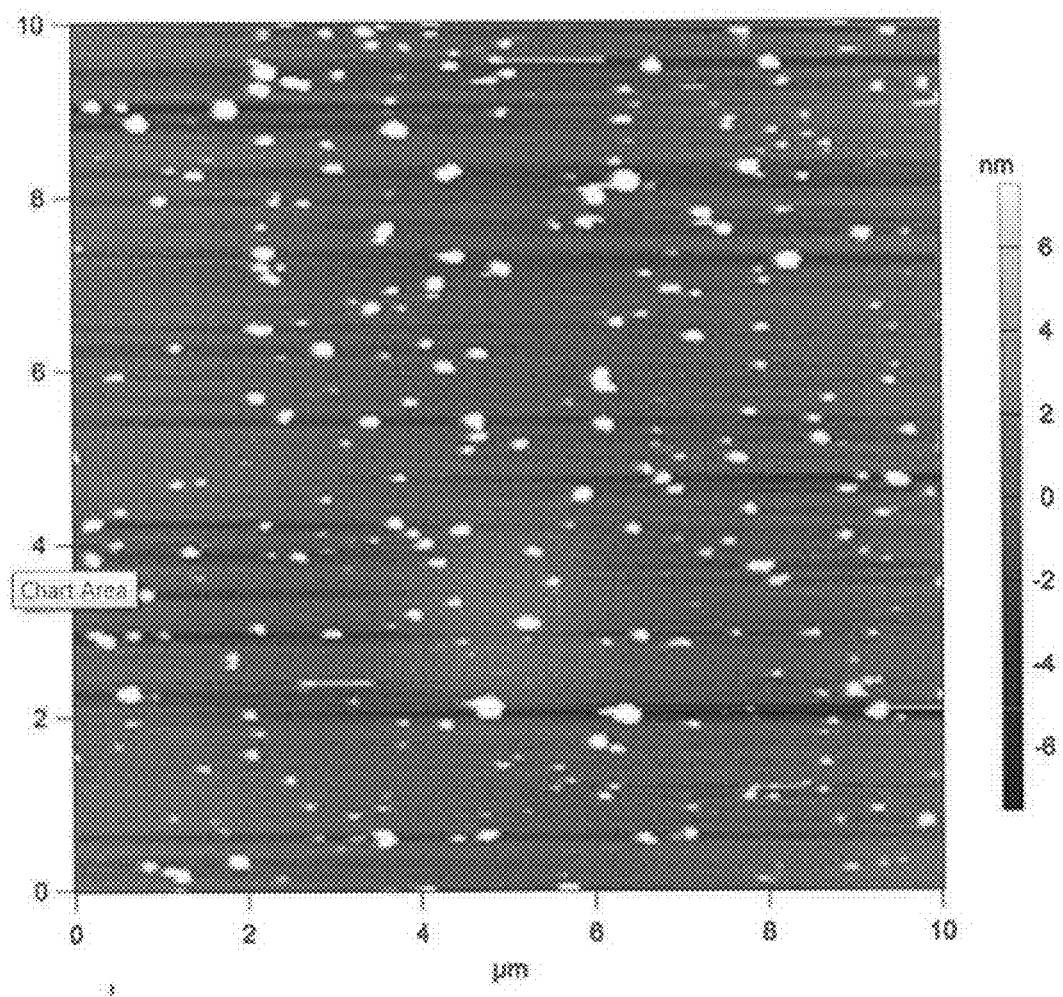
FIG. 12b shows a topographical AFM image according to Example 2.

As-synthesized iron oxide NP's were characterized using DLS and AFM. FIG. 12a displays the DLS plot for the size measurement of as-synthesized NP's showing that the average hydrodynamic size of NP's was about 109.2 nm. FIG. 12b was the topographical AFM image of the same NP's which shows that as-synthesized and two time washed nanoparticles were fairly monodispersed with the average particle size of about 15 nm.

Figure 13:
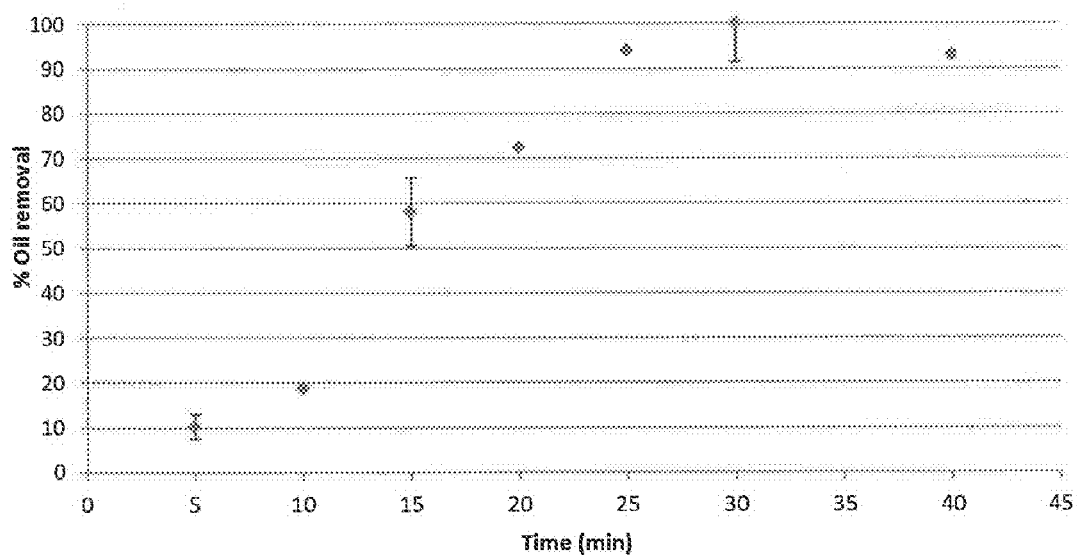
FIG. 13 shows the percentage removal vs. time according to Example 2.

FIG. 13 shows the percentage removal vs. the time (based on UV-Vis measurements) using these iron oxide nanoparticles, with an initial oil concentration of 0.9 g/liter. The iron-oxide mass that was used for each experiment was 0.06 mg FeO.

Example 3

Solutions were tested with the same magnetic NPs using food-grade oil in either gastric or intestinal solution. The oils tested were olive oil (Carlini Co.), vegetable oil (Carlini Co.), and canola oil (Crisco Co.). Gastric solution was prepared by dissolving 1.25 gr of pepsin A, 0.5 gr of sodium malate, 0.5 gr of sodium citrate, 0.42 mL of lactic acid, and 0.5 mL of acetic acid in 1 L of ultra-pure water and the pH of solution was adjusted to 2.5 by addition of HCl. For simulating intestinal phase, 50 mg of pancreatin and 175 mg of bile salts were added to 100 mL of gastric solution and pH raised by adjustment with a saturated solution of $NaHCO_3$. (Turner, A.; Ip, K. H., Bioaccessibility of metals in dust from the indoor environment: application of a physiologically based extraction test. Environ Sci Technol 2007, 41 (22), 7851-6.)

First, three separate solutions of 23 mg of oil (one solution for each type of oil tested) in 10 mL of stomach fluid were made, and the fluorescence and UV-vis spectra were examined for each. Then, the NPs were added to the oil/stomach fluid mixture so that the oil:NPs weight ratio was 23:1 and the samples were mixed in an incubator at body temperature (37° C.) for 2 hours. The fluorescence and UV-vis spectra were again examined for each. Finally, the NPs were removed from the solution, and the fluorescence and UV-vis spectra were once again examined for each.

Figure 14A:
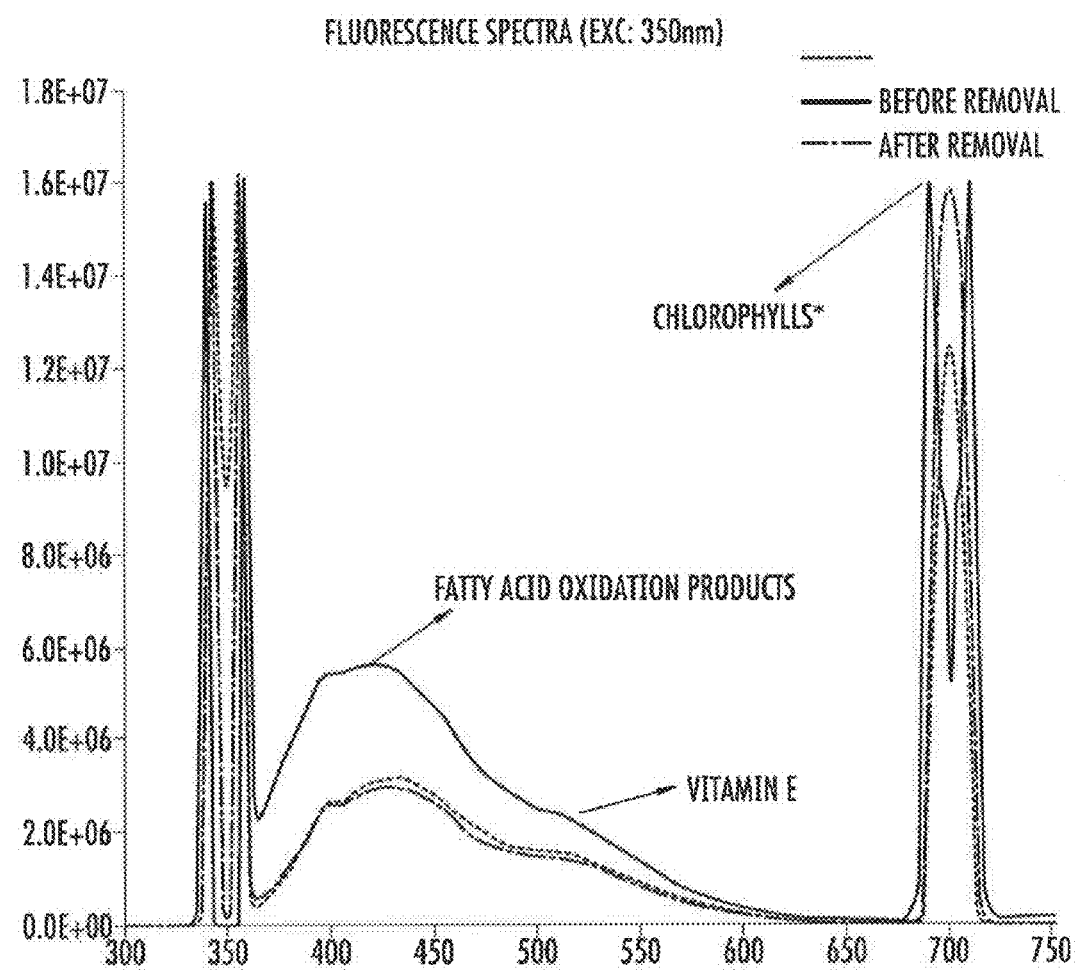
FIG. 14a shows the fluorescence spectra for the solution made with olive oil according to Example 3 prior to addition of oil to the stomach fluid, after the addition of the oil and the NPs, and after the removal of the NPs.
Figure 14B:
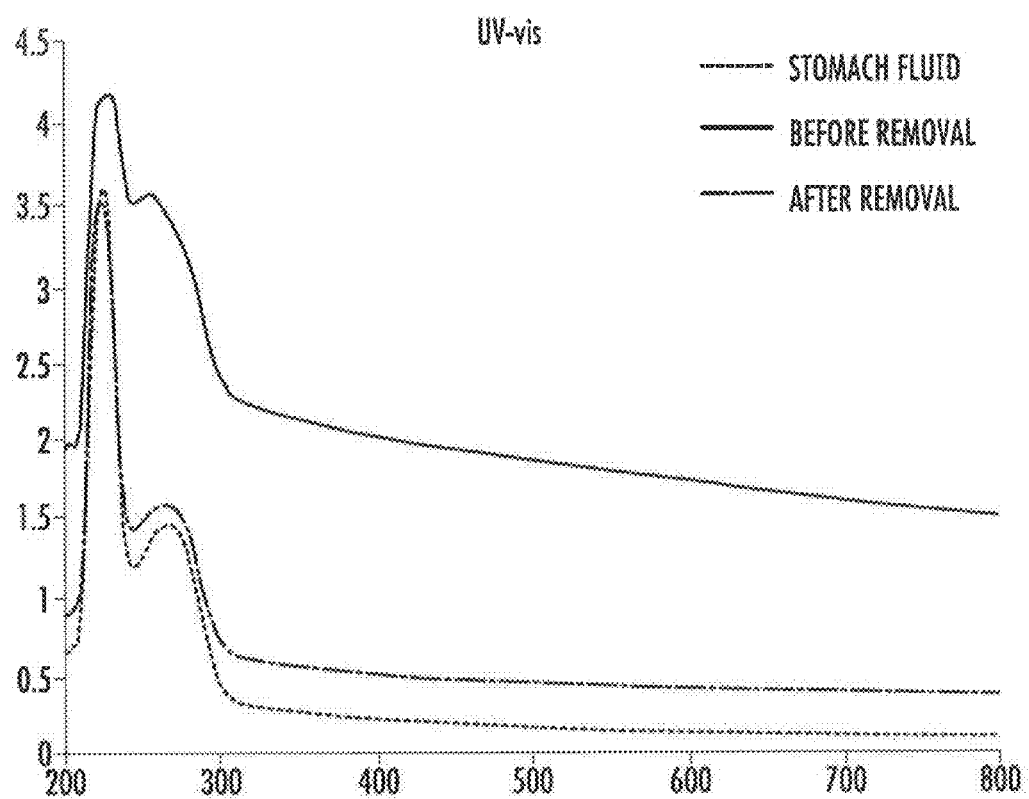
FIG. 14b shows UV-vis spectra for the solution made with olive oil according to Example 3 prior to addition of oil to the stomach fluid, after the addition of the oil and the NPs, and after the removal of the NPs.

FIGS. 14a and 14b show the fluorescence and UV-vis spectra, respectively, for the stomach fluid prior to addition of the olive oil prior, after the addition of the oil and the NPs, and after the removal of the NPs. As seen from FIGS. 14a and 14b, the fluorescence and UV-vis spectra after treatment with the NPs closely tracks the stomach fluid alone, indicating that the oil was removed by the NPs.

Figure 15A:
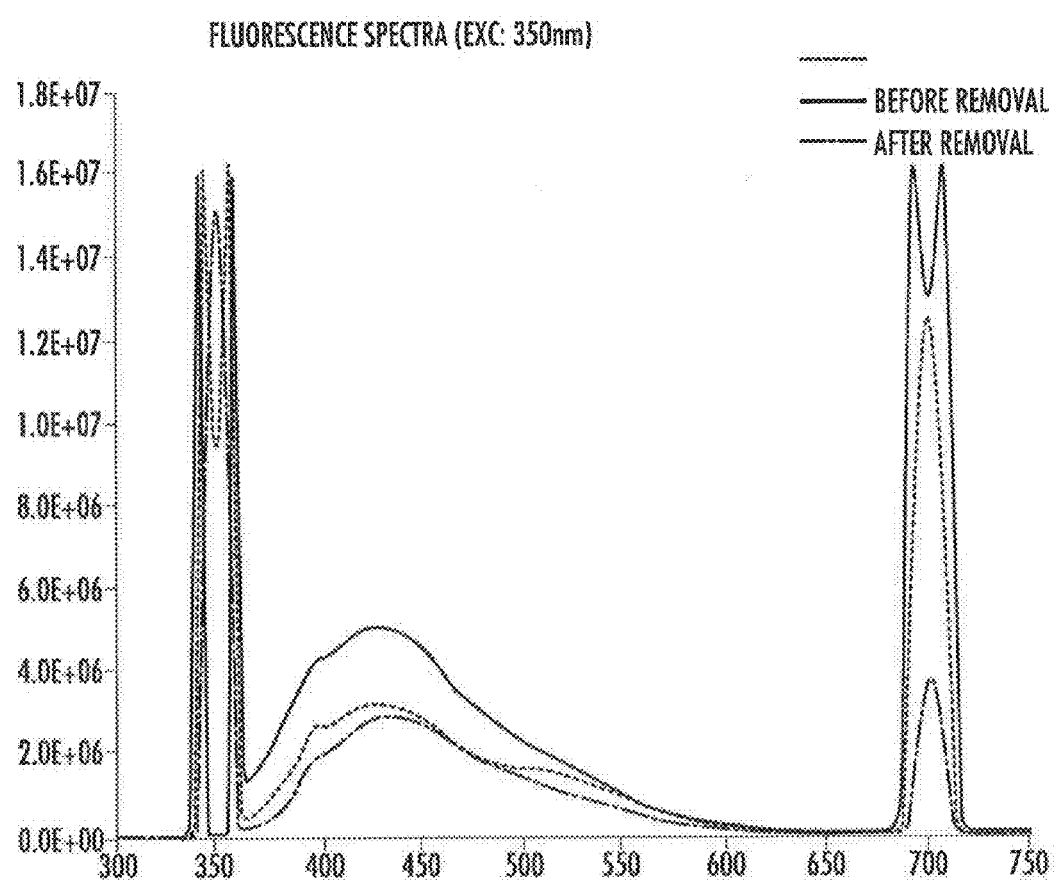
FIG. 15a shows the fluorescence spectra for the solution made with vegetable oil according to Example 3 prior to addition of oil to the stomach fluid, after the addition of the oil and the NPs, and after the removal of the NI's.
Figure 15B:
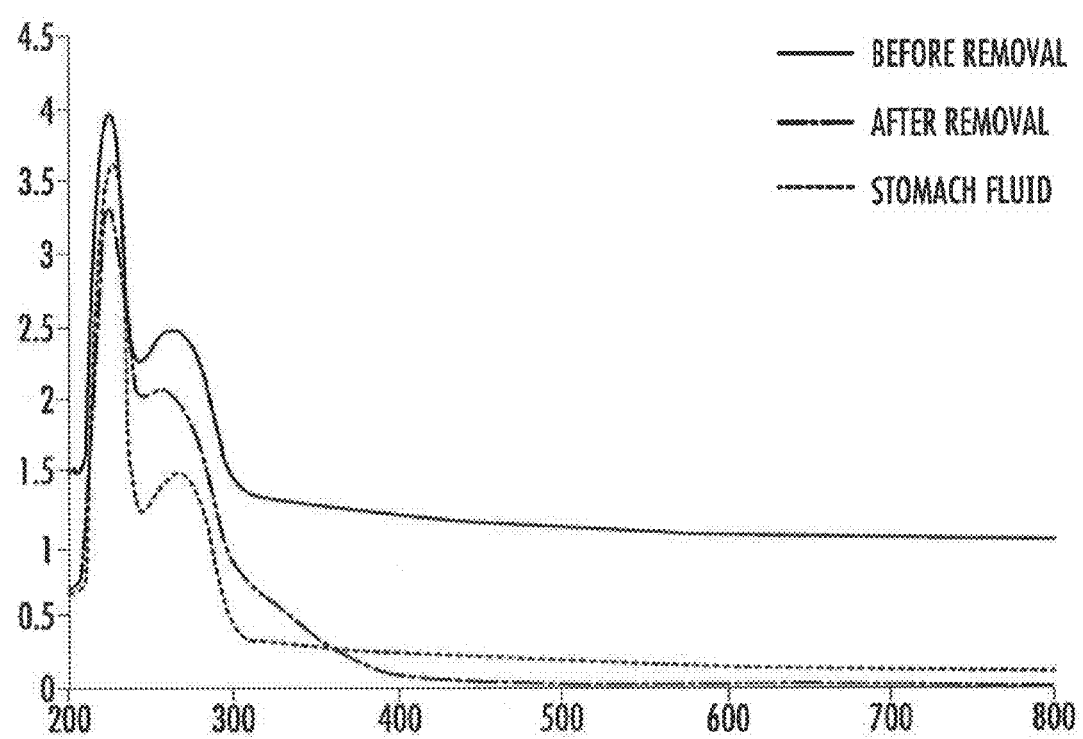
FIG. 15b shows UV-vis spectra for the solution made with vegetable oil according to Example 3 prior to addition of oil to the stomach fluid, after the addition of the oil and the NPs, and after the removal of the NPs.

FIGS. 15a and 15b show the fluorescence and UV-vis spectra, respectively, for the stomach fluid prior to addition of the vegetable oil prior, after the addition of the oil and the NPs, and after the removal of the NPs. As seen from FIGS. 15a and 15b, the fluorescence and UV-vis spectra after treatment with the NPs closely tracks the stomach fluid alone, indicating that the oil was removed by the NPs.

Figure 16A:
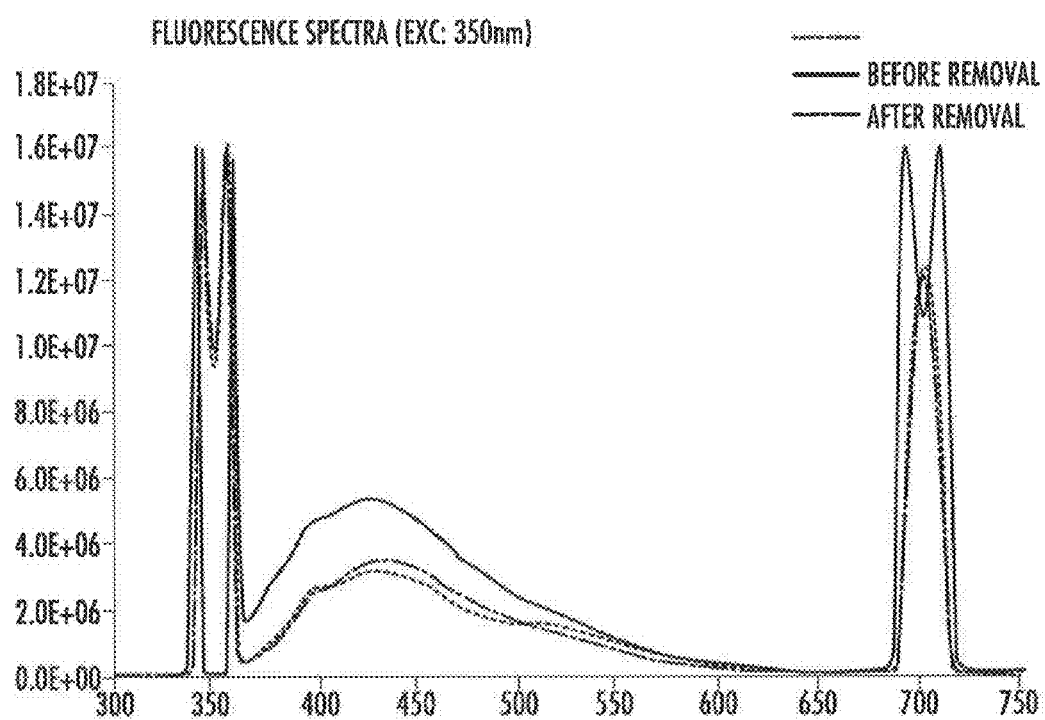
FIG. 16a shows the fluorescence spectra for the solution made with canola oil according to Example 3 prior to addition of oil to the stomach fluid, after the addition of the oil and the NPs, and after the removal of the NPs.
Figure 16B:
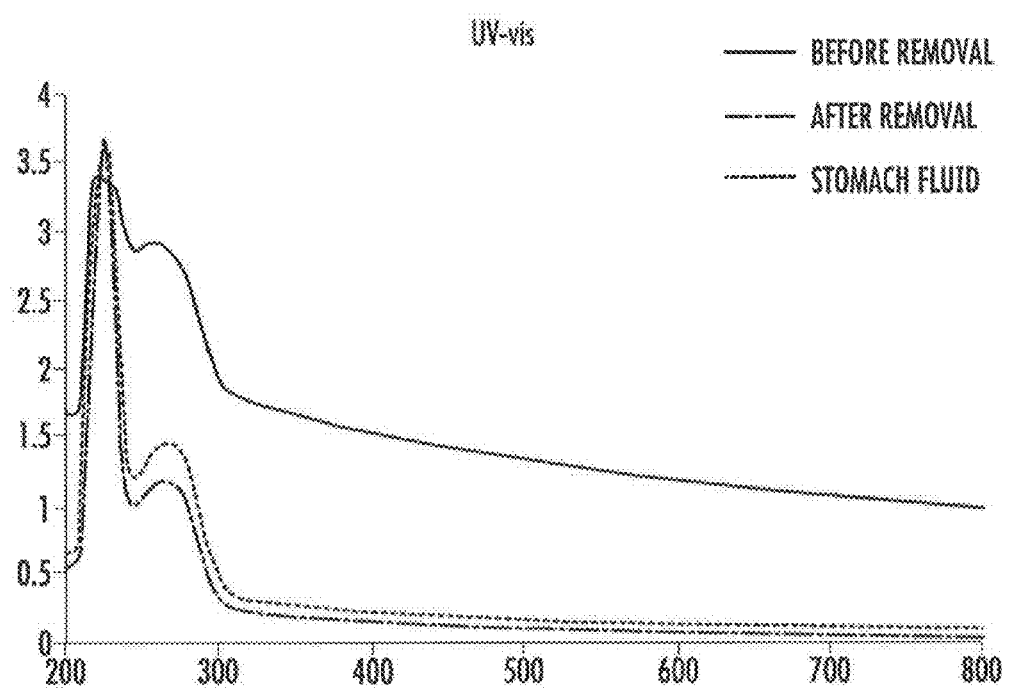
FIG. 16b shows UV-vis spectra for the solution made with canola oil according to Example 3 prior to addition of oil to the stomach fluid, after the addition of the oil and the NPs, and after the removal of the NPs.
Figure 17A:
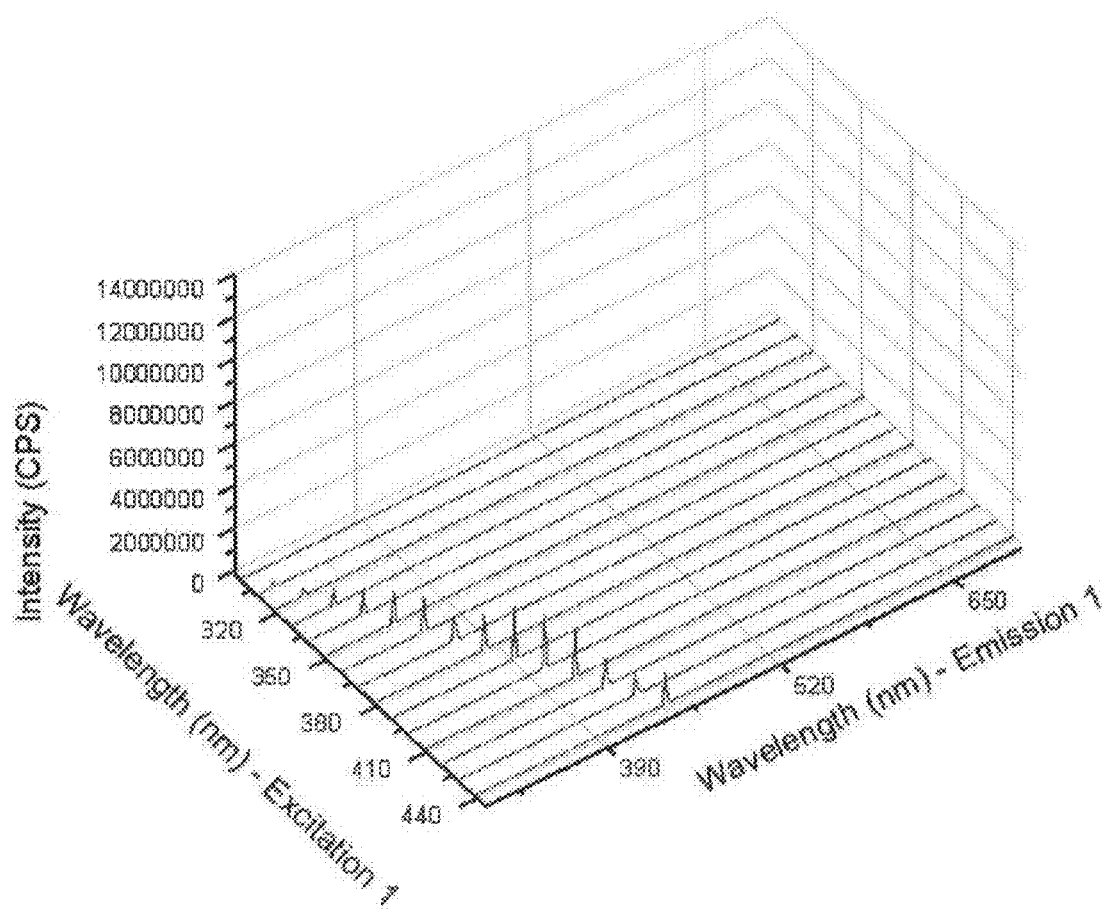
FIG. 17a shows the 3D-fluorescence chart for the stomach fluid prior to adding the canola oil solution according to Example 3.
Figure 17B:
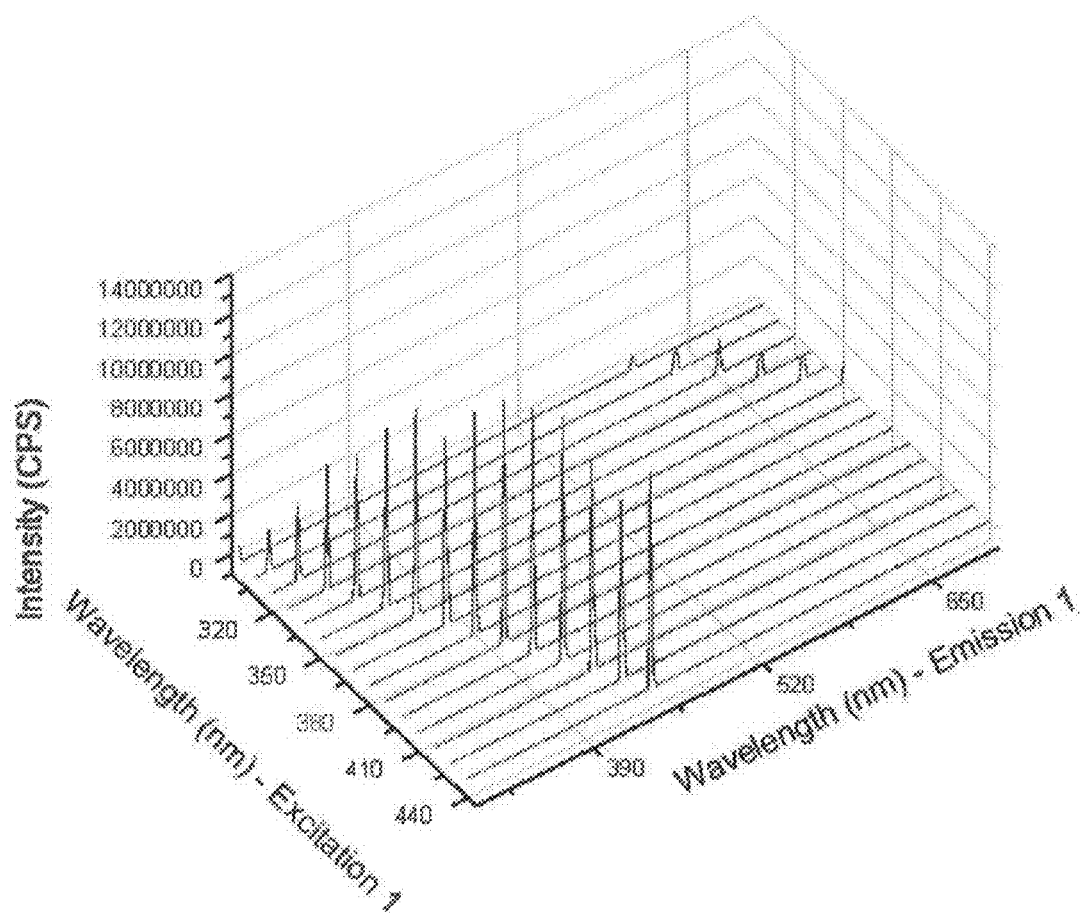
FIG. 17b shows the 3D-fluorescence chart for the canola oil and stomach fluid solution prior to treating with the nanoparticles according to Example 3.
Figure 17C:
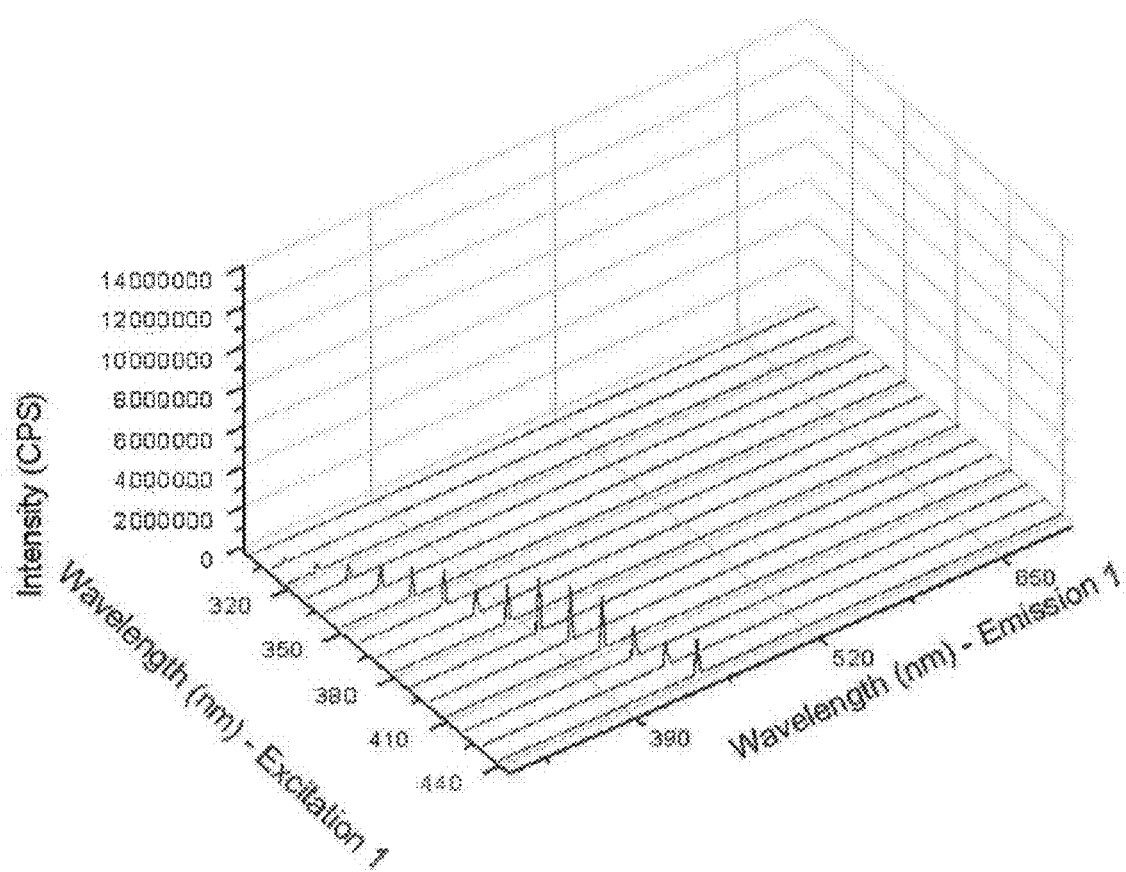
FIG. 17c shows the 3D-fluorescence chart for the canola oil solution after treating the canola oil and stomach fluid solution with and removing the NPs.

FIGS. 16a and 16b show the fluorescence and UV-vis spectra, respectively, for the stomach fluid prior to addition of the canola oil prior, after the addition of the oil and the NPs, and after the removal of the NPs. As seen from FIGS. 16a and 16b, the fluorescence and UV-vis spectra after treatment with the NPs closely tracks the stomach fluid alone, indicating that the oil was removed by the NPs. Further evidence is provided in the form of FIGS. 17a, 17b, and 17c, which show the 3D-fluorescence chart for the canola oil solution at different stages of the experiment: respectively, prior to adding the oil (i.e., the stomach fluid alone), after the addition of the canola oil but prior to treatment with the NPs, and after treating with and removing the NPs. A comparison of FIGS. 17a (prior to the addition of the oil) and 17c (after the addition of the oil, treatment with the NPs, and removal of the NPs) shows that most, if not all, of the oil was removed through treatment of the NPs.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of extracting oil from a multiphasic liquid, the method comprising:
   introducing the multiphasic liquid to a plurality of nanoparticles, wherein the nanoparticles comprise a core and a polymeric shell, the core comprising an inner core that includes gold and an outer core that includes silver, wherein the polymeric shell is chemically or mechanically bonded around the core, wherein the polymeric shell includes from 75 wt. % to 100 wt. % polyvinylpyrrolidone, and wherein the polyvinylpyrrolidone has a molecular mass of from about 10 kDa to about 200 kDa; and
   allowing oil in the multiphasic liquid to be adsorbed by the polymeric shell, wherein the core has an average diameter of about 15 nm to about 50 nm and the polymeric shell has a thickness of about 1 to about 50 nm on the core.

2. The method as in claim 1, further comprising:
   removing the nanoparticles from the multiphasic liquid.

3. The method as in claim 2, further comprising:
   thereafter, recovering the oil adsorbed by the polymeric shell.

4. The method as in claim 1, wherein introducing the multiphasic liquid to a plurality of nanoparticles comprises: flowing the multiphasic liquid through a cartridge, wherein the cartridge comprises the plurality of nanoparticles.

5. The method as in claim 1, wherein the multiphasic liquid comprises oil and water.

6. The method as in claim 1, wherein the multiphasic liquid is oil and sea water.

7. The method as in claim 6, wherein the multiphasic liquid is sea water in an area of an oil spill.

8. The method as in claim 1, wherein the multiphasic liquid comprises stomach fluid and a food-grade oil.

9. The method as in claim 8, wherein the food-grade oil comprises olive oil, vegetable oil, canola oil, or a mixture thereof.

\* \* \* \* \*